United States Patent
Gunasekara et al.

(10) Patent No.: US 10,687,371 B2
(45) Date of Patent: Jun. 16, 2020

(54) APPARATUS AND METHOD FOR WIRELESS NETWORK SERVICES IN MOVING VEHICLES

(71) Applicant: Time Warner Cable Enterprises LLC, St. Louis, MO (US)

(72) Inventors: Don Gunasekara, Reston, VA (US); Laxman Nallani, Aldie, VA (US)

(73) Assignee: TIME WARNER CABLE ENTERPRISES LLC, St. Louis, MO (US)

(*) Notice: Subject to any disclaimer, the term of this patent is extended or adjusted under 35 U.S.C. 154(b) by 106 days.

(21) Appl. No.: 15/919,030

(22) Filed: Mar. 12, 2018

(65) Prior Publication Data

US 2018/0279391 A1  Sep. 27, 2018

Related U.S. Application Data

(63) Continuation of application No. 15/002,232, filed on Jan. 20, 2016, now Pat. No. 9,918,345.

(51) Int. Cl.
*H04W 76/10* (2018.01)
*H04L 29/08* (2006.01)
(Continued)

(52) U.S. Cl.
CPC ............. *H04W 76/10* (2018.02); *H04L 12/14* (2013.01); *H04L 12/141* (2013.01);
(Continued)

(58) Field of Classification Search
CPC ....... H04W 76/10; H04W 4/24; H04W 48/16; H04W 48/20; H04W 84/12; H04L 12/14;
(Continued)

(56) References Cited

U.S. PATENT DOCUMENTS 5,313,454 A  5/1994 Bustini et al.
5,369,707 A  11/1994 Follendore, III
(Continued)

FOREIGN PATENT DOCUMENTS

EP  1139198 A2  10/2001
EP  2113860 A1  11/2009
(Continued)

OTHER PUBLICATIONS

5C Digital Transmission Content Protection White Paper, Hitachi, Ltd., et al., dated Jul. 14, 1998, 15 pages.
(Continued)

*Primary Examiner* — Obaidul Huq
(74) *Attorney, Agent, or Firm* — Gazdzinski & Associates, PC

(57) ABSTRACT

Apparatus and methods for providing backhaul access connectivity to e.g., a vehicular hotspot. In one embodiment, a wireless network of access points comprises so-called "parent access points" (PAPs), "child access points" (CAPs), and "transit access points" (TAPs). Each PAP operates as a service gateway and provides a wireless coverage area, which is further augmented by the coverages of its subsidiary CAPs. Each TAP can connect to either a PAP or a CAP for backhaul access. During exemplary operation, a user's Wi-Fi client device connects to a TAP located in the vehicle (e.g., car, train, bus, etc.), and provides connectivity to a host managed content distribution network to which the user subscribes.

21 Claims, 12 Drawing Sheets

(51) Int. Cl.
  *H04W 48/16*    (2009.01)
  *H04W 4/24*     (2018.01)
  *H04M 15/00*    (2006.01)
  *H04W 48/20*    (2009.01)
  *H04L 29/14*    (2006.01)
  *H04L 12/14*    (2006.01)
  *H04W 84/12*    (2009.01)

(52) U.S. Cl.
  CPC ...... *H04L 12/1403* (2013.01); *H04L 67/1097* (2013.01); *H04L 67/12* (2013.01); *H04L 67/20* (2013.01); *H04L 67/26* (2013.01); *H04L 67/2833* (2013.01); *H04L 69/40* (2013.01); *H04M 15/68* (2013.01); *H04M 15/8235* (2013.01); *H04W 4/24* (2013.01); *H04W 48/16* (2013.01); *H04W 48/20* (2013.01); *H04W 84/12* (2013.01)

(58) Field of Classification Search
  CPC ............... H04L 12/1403; H04L 12/141; H04L 67/1097; H04L 67/12; H04L 67/20; H04L 67/26; H04L 67/2833; H04L 69/40; H04M 15/68; H04M 15/8235
  USPC ........................................ 370/310, 328, 338
  See application file for complete search history.

(56) References Cited

U.S. PATENT DOCUMENTS

| | | |
|---|---|---|
| 5,528,284 A | 6/1996 | Iwami et al. |
| 5,577,209 A | 11/1996 | Boyle et al. |
| 5,708,961 A | 1/1998 | Hylton et al. |
| 5,715,403 A | 2/1998 | Stefik |
| 5,774,170 A | 6/1998 | Hite et al. |
| 5,787,172 A | 7/1998 | Arnold |
| 5,818,438 A | 10/1998 | Howe et al. |
| 5,828,832 A | 10/1998 | Holden et al. |
| 5,862,312 A | 1/1999 | Mann et al. |
| 5,870,474 A | 2/1999 | Wasilewski et al. |
| 5,878,324 A | 3/1999 | Borth et al. |
| 5,897,635 A | 4/1999 | Torres et al. |
| 5,926,205 A | 7/1999 | Krause et al. |
| 5,935,206 A | 8/1999 | Dixon et al. |
| 5,982,412 A | 11/1999 | Nulty |
| 6,002,393 A | 12/1999 | Hite et al. |
| 6,009,103 A | 12/1999 | Woundy |
| 6,092,178 A | 7/2000 | Jindal et al. |
| 6,128,316 A | 10/2000 | Takeda et al. |
| 6,134,532 A | 10/2000 | Lazarus et al. |
| 6,148,400 A | 11/2000 | Arnold |
| 6,154,844 A | 11/2000 | Touboul et al. |
| 6,157,719 A | 12/2000 | Wasilewski et al. |
| 6,167,432 A | 12/2000 | Jiang |
| 6,167,521 A | 12/2000 | Smith et al. |
| 6,169,728 B1 | 1/2001 | Perreault et al. |
| 6,181,697 B1 | 1/2001 | Nurenberg et al. |
| 6,211,901 B1 | 4/2001 | Imajima et al. |
| 6,212,636 B1 | 4/2001 | Boyle et al. |
| 6,219,710 B1 | 4/2001 | Gray et al. |
| 6,219,840 B1 | 4/2001 | Corrigan et al. |
| 6,233,341 B1 | 5/2001 | Riggins |
| 6,233,687 B1 | 5/2001 | White |
| 6,240,553 B1 | 5/2001 | Son et al. |
| 6,249,680 B1 | 6/2001 | Wax et al. |
| 6,256,393 B1 | 7/2001 | Safadi et al. |
| 6,259,701 B1 | 7/2001 | Shur et al. |
| 6,266,421 B1 | 7/2001 | Domyo et al. |
| 6,330,609 B1 | 12/2001 | Garofalakis et al. |
| 6,353,626 B1 | 3/2002 | Sunay et al. |
| 6,378,130 B1 | 4/2002 | Adams |
| 6,434,141 B1 | 8/2002 | Oz et al. |
| 6,456,716 B1 | 9/2002 | Arnold |
| 6,463,585 B1 | 10/2002 | Hendricks et al. |
| 6,498,783 B1 | 12/2002 | Lin |
| 6,519,062 B1 | 2/2003 | Yoo |
| 6,523,696 B1 | 2/2003 | Saito et al. |
| 6,590,865 B1 | 7/2003 | Ibaraki et al. |
| 6,601,171 B1 | 7/2003 | Carter et al. |
| 6,640,145 B2 | 10/2003 | Hoffberg et al. |
| 6,657,991 B1 | 12/2003 | Akgun et al. |
| 6,687,735 B1 | 2/2004 | Logston et al. |
| 6,694,145 B2 | 2/2004 | Riikonen et al. |
| 6,711,148 B1 | 3/2004 | Hills |
| 6,718,551 B1 | 4/2004 | Swix et al. |
| 6,738,978 B1 | 5/2004 | Hendricks et al. |
| 6,742,116 B1 | 5/2004 | Matsui et al. |
| 6,760,768 B2 | 7/2004 | Holden et al. |
| 6,763,391 B1 | 7/2004 | Ludtke |
| 6,782,550 B1 | 8/2004 | Cao |
| 6,785,810 B1 | 8/2004 | Lirov et al. |
| 6,788,676 B2 | 9/2004 | Partanen et al. |
| 6,799,047 B1 | 9/2004 | Bahl et al. |
| 6,807,573 B2 | 10/2004 | Saito et al. |
| 6,813,505 B2 | 11/2004 | Walley et al. |
| 6,842,783 B1 | 1/2005 | Boivie et al. |
| 6,859,535 B1 | 2/2005 | Tatebayashi et al. |
| 6,891,841 B2 | 5/2005 | Leatherbury et al. |
| 6,898,708 B2 | 5/2005 | Hori et al. |
| 6,910,064 B1 | 6/2005 | Astarabadi et al. |
| 6,925,257 B2 | 8/2005 | Yoo |
| 6,944,150 B1 | 9/2005 | McConnell et al. |
| 6,948,183 B1 | 9/2005 | Peterka |
| 6,954,632 B2 | 10/2005 | Kobayashi |
| 6,957,261 B2 | 10/2005 | Lortz |
| 6,957,328 B2 | 10/2005 | Goodman et al. |
| 6,973,576 B2 | 12/2005 | Giobbi |
| 6,975,730 B1 | 12/2005 | Kuroiwa et al. |
| 6,985,355 B2 | 1/2006 | Allirot |
| 6,986,156 B1 | 1/2006 | Rodriguez et al. |
| 6,996,544 B2 | 2/2006 | Sellars et al. |
| 7,006,881 B1 | 2/2006 | Hoffberg et al. |
| 7,007,170 B2 | 2/2006 | Morten |
| 7,009,972 B2 | 3/2006 | Maher et al. |
| 7,016,963 B1 | 3/2006 | Judd et al. |
| 7,017,189 B1 | 3/2006 | Demello et al. |
| 7,027,460 B2 | 4/2006 | Iyer et al. |
| 7,039,048 B1 | 5/2006 | Monta et al. |
| 7,054,443 B1 | 5/2006 | Jakubowski et al. |
| 7,054,902 B2 | 5/2006 | Toporek et al. |
| 7,055,040 B2 | 5/2006 | Klemba et al. |
| 7,065,216 B1 | 6/2006 | Benaloh et al. |
| 7,068,639 B1 | 6/2006 | Varma et al. |
| 7,069,449 B2 | 6/2006 | Weaver et al. |
| 7,069,573 B1 | 6/2006 | Brooks et al. |
| 7,072,950 B2 | 7/2006 | Toft |
| 7,073,199 B1 | 7/2006 | Raley |
| 7,075,945 B2 | 7/2006 | Arsenault et al. |
| 7,086,077 B2 | 8/2006 | Giammaressi |
| 7,092,397 B1 | 8/2006 | Chandran et al. |
| 7,099,308 B2 | 8/2006 | Merrill et al. |
| 7,103,181 B2 | 9/2006 | Ananth |
| 7,106,382 B2 | 9/2006 | Shiotsu |
| 7,107,326 B1 | 9/2006 | Fijolek et al. |
| 7,143,431 B1 | 11/2006 | Eager et al. |
| 7,149,772 B1 | 12/2006 | Kalavade |
| 7,154,912 B2 | 12/2006 | Chong et al. |
| 7,165,268 B1 | 1/2007 | Moore et al. |
| 7,174,126 B2 | 2/2007 | McElhatten et al. |
| 7,174,127 B2 | 2/2007 | Otten et al. |
| 7,174,371 B2 | 2/2007 | Elo et al. |
| 7,174,385 B2 | 2/2007 | Li |
| 7,194,756 B2 | 3/2007 | Addington et al. |
| 7,209,458 B2 | 4/2007 | Ahvonen et al. |
| 7,225,333 B2 | 5/2007 | Peinado et al. |
| 7,228,427 B2 | 6/2007 | Fransdonk |
| 7,228,555 B2 | 6/2007 | Schlack |
| 7,237,112 B1 | 6/2007 | Ishiguro et al. |
| 7,242,960 B2 | 7/2007 | Van Rooyen |
| 7,248,694 B2 | 7/2007 | Husemann et al. |
| 7,254,608 B2 | 8/2007 | Yeager et al. |
| 7,257,227 B2 | 8/2007 | Chen et al. |
| 7,266,726 B1 | 9/2007 | Ladd et al. |

(56) References Cited

U.S. PATENT DOCUMENTS

| | | |
|---|---|---|
| 7,289,534 B1 | 10/2007 | Bailey et al. |
| 7,299,502 B2 | 11/2007 | Schmeling et al. |
| 7,305,460 B2 | 12/2007 | Park |
| 7,308,415 B2 | 12/2007 | Kimbrel et al. |
| 7,313,611 B1 | 12/2007 | Jacobs et al. |
| 7,324,531 B2 | 1/2008 | Cho |
| 7,325,073 B2 | 1/2008 | Shao et al. |
| 7,330,483 B1 | 2/2008 | Peters, Jr. et al. |
| 7,330,967 B1 | 2/2008 | Pujare et al. |
| 7,334,044 B1 | 2/2008 | Allen |
| 7,340,759 B1 | 3/2008 | Rodriguez |
| 7,346,688 B2 | 3/2008 | Allen et al. |
| 7,353,543 B2 | 4/2008 | Ohmori et al. |
| 7,363,371 B2 | 4/2008 | Kirby et al. |
| 7,373,506 B2 | 5/2008 | Asano et al. |
| 7,376,386 B2 | 5/2008 | Phillips et al. |
| 7,376,976 B2 | 5/2008 | Fierstein et al. |
| 7,379,494 B2 | 5/2008 | Raleigh et al. |
| 7,409,546 B2 | 8/2008 | Platt |
| 7,457,520 B2 | 11/2008 | Rossetti et al. |
| 7,464,179 B2 | 12/2008 | Hodges et al. |
| 7,472,280 B2 | 12/2008 | Giobbi |
| 7,486,869 B2 | 2/2009 | Alexander et al. |
| 7,487,363 B2 | 2/2009 | Alve et al. |
| 7,506,367 B1 | 3/2009 | Ishibashi |
| 7,551,574 B1 | 6/2009 | Peden et al. |
| 7,567,565 B2 | 7/2009 | La Joie |
| 7,577,118 B2 | 8/2009 | Haumonte et al. |
| 7,592,912 B2 | 9/2009 | Hasek et al. |
| 7,602,820 B2 | 10/2009 | Helms et al. |
| 7,673,004 B1 | 3/2010 | Sherstinsky et al. |
| 7,690,020 B2 | 3/2010 | Lebar |
| 7,693,171 B2 | 4/2010 | Gould |
| 7,707,644 B2 | 4/2010 | Choi et al. |
| 7,721,314 B2 | 5/2010 | Sincaglia et al. |
| 7,730,321 B2 | 6/2010 | Gasparini et al. |
| 7,742,074 B2 | 6/2010 | Minatogawa |
| 7,752,617 B2 | 7/2010 | Blinick et al. |
| 7,757,101 B2 | 7/2010 | Nonaka et al. |
| 7,783,891 B2 | 8/2010 | Perlin et al. |
| 7,809,942 B2 | 10/2010 | Baran et al. |
| 7,860,507 B2 | 12/2010 | Kalika et al. |
| 7,865,440 B2 | 1/2011 | Jaquette |
| 7,870,599 B2 | 1/2011 | Pemmaraju |
| 7,925,592 B1 | 4/2011 | Issa et al. |
| 7,930,558 B2 | 4/2011 | Hori |
| 7,930,715 B2 | 4/2011 | Hendricks et al. |
| 7,954,131 B2 | 5/2011 | Cholas et al. |
| 7,983,418 B2 | 7/2011 | Oyama et al. |
| 8,041,785 B2 | 10/2011 | Mazur et al. |
| 8,084,792 B2 | 12/2011 | Lehmann et al. |
| 8,166,508 B2 | 4/2012 | Mitsuji et al. |
| 8,181,262 B2 | 5/2012 | Cooper et al. |
| 8,234,387 B2 | 7/2012 | Bradley et al. |
| 8,280,982 B2 | 10/2012 | La Joie et al. |
| 8,306,634 B2 | 11/2012 | Nguyen et al. |
| 8,332,370 B2 | 12/2012 | Gattegno et al. |
| 8,341,242 B2 | 12/2012 | Dillon et al. |
| 8,442,265 B1 | 5/2013 | Bosworth et al. |
| 8,583,484 B1 | 11/2013 | Chalawsky et al. |
| 8,713,623 B2 | 4/2014 | Brooks |
| 8,842,615 B1 | 9/2014 | Kalbag et al. |
| 8,862,155 B2 | 10/2014 | Stern et al. |
| 8,866,911 B1 | 10/2014 | Sivertsen |
| 8,898,270 B1 | 11/2014 | Stack et al. |
| 9,003,436 B2 | 4/2015 | Tidwell et al. |
| 9,027,062 B2 | 5/2015 | Patel et al. |
| 9,071,859 B2 | 6/2015 | Lajoie |
| 9,215,423 B2 | 12/2015 | Kimble et al. |
| 9,300,919 B2 | 3/2016 | Cholas et al. |
| 9,906,838 B2 | 2/2018 | Cronk et al. |
| 9,918,345 B2 | 3/2018 | Gunasekara et al. |
| 2001/0004768 A1 | 6/2001 | Hodge et al. |
| 2001/0014946 A1 | 8/2001 | Ichinoi et al. |
| 2001/0019614 A1 | 9/2001 | Madoukh et al. |
| 2001/0029581 A1 | 10/2001 | Knauft |
| 2001/0030785 A1 | 10/2001 | Pangrac et al. |
| 2001/0053223 A1 | 12/2001 | Ishibashi et al. |
| 2001/0053226 A1 | 12/2001 | Akins et al. |
| 2001/0056541 A1 | 12/2001 | Matsuzaki et al. |
| 2002/0013772 A1 | 1/2002 | Peinado |
| 2002/0026575 A1 | 2/2002 | Wheeler et al. |
| 2002/0027883 A1 | 3/2002 | Belaiche |
| 2002/0032754 A1 | 3/2002 | Logston et al. |
| 2002/0049902 A1 | 4/2002 | Rhodes |
| 2002/0054589 A1 | 5/2002 | Ethridge et al. |
| 2002/0055978 A1 | 5/2002 | Joon-Bo et al. |
| 2002/0056125 A1 | 5/2002 | Hodge et al. |
| 2002/0059619 A1 | 5/2002 | Lebar |
| 2002/0062440 A1 | 5/2002 | Akama |
| 2002/0063621 A1 | 5/2002 | Tseng et al. |
| 2002/0066033 A1 | 5/2002 | Dobbins et al. |
| 2002/0077984 A1 | 6/2002 | Ireton |
| 2002/0087976 A1 | 7/2002 | Kaplan et al. |
| 2002/0123928 A1 | 9/2002 | Eldering et al. |
| 2002/0126654 A1 | 9/2002 | Preston et al. |
| 2002/0129358 A1 | 9/2002 | Buehl et al. |
| 2002/0129378 A1 | 9/2002 | Cloonan et al. |
| 2002/0147771 A1 | 10/2002 | Traversat et al. |
| 2002/0152299 A1 | 10/2002 | Traversat et al. |
| 2002/0152393 A1 | 10/2002 | Thoma et al. |
| 2002/0183985 A1 | 12/2002 | Hori et al. |
| 2002/0188744 A1 | 12/2002 | Mani |
| 2002/0188869 A1 | 12/2002 | Patrick |
| 2002/0199105 A1 | 12/2002 | Ishiguro et al. |
| 2003/0002862 A1 | 1/2003 | Rodriguez et al. |
| 2003/0005453 A1 | 1/2003 | Rodriguez et al. |
| 2003/0007516 A1 | 1/2003 | Abramov et al. |
| 2003/0009681 A1 | 1/2003 | Harada et al. |
| 2003/0021421 A1 | 1/2003 | Yokota et al. |
| 2003/0041336 A1 | 2/2003 | Del Sordo et al. |
| 2003/0046560 A1 | 3/2003 | Inomata et al. |
| 2003/0046704 A1 | 3/2003 | Laksono et al. |
| 2003/0048380 A1 | 3/2003 | Tamura |
| 2003/0056217 A1 | 3/2003 | Brooks |
| 2003/0061619 A1 | 3/2003 | Giammaressi |
| 2003/0069965 A1 | 4/2003 | Ma et al. |
| 2003/0071117 A1 | 4/2003 | Meade |
| 2003/0074571 A1 | 4/2003 | Fujiwara et al. |
| 2003/0084003 A1 | 5/2003 | Pinkas et al. |
| 2003/0097340 A1 | 5/2003 | Okamoto et al. |
| 2003/0099212 A1 | 5/2003 | Anjum et al. |
| 2003/0114162 A1 | 6/2003 | Chheda et al. |
| 2003/0115267 A1 | 6/2003 | Hinton et al. |
| 2003/0139980 A1 | 7/2003 | Hamilton |
| 2003/0140227 A1 | 7/2003 | Asano et al. |
| 2003/0163697 A1 | 8/2003 | Pabla et al. |
| 2003/0163739 A1 | 8/2003 | Armington et al. |
| 2003/0165241 A1 | 9/2003 | Fransdonk |
| 2003/0166401 A1 | 9/2003 | Combes et al. |
| 2003/0174838 A1 | 9/2003 | Bremer |
| 2003/0179773 A1 | 9/2003 | Mocek et al. |
| 2003/0187799 A1 | 10/2003 | Sellars et al. |
| 2003/0205763 A1 | 11/2003 | Park et al. |
| 2003/0208763 A1 | 11/2003 | McElhatten et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0019691 A1 | 1/2004 | Daymond et al. |
| 2004/0024688 A1 | 2/2004 | Bi et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0078602 A1 | 4/2004 | Rothbarth et al. |
| 2004/0088558 A1 | 5/2004 | Candelore |
| 2004/0106403 A1 | 6/2004 | Mori et al. |
| 2004/0109569 A1 | 6/2004 | Ellison et al. |
| 2004/0117836 A1 | 6/2004 | Karaoguz et al. |
| 2004/0123129 A1 | 6/2004 | Ginter et al. |
| 2004/0128499 A1 | 7/2004 | Peterka et al. |
| 2004/0133907 A1 | 7/2004 | Rodriguez et al. |
| 2004/0133923 A1 | 7/2004 | Watson et al. |
| 2004/0137918 A1 | 7/2004 | Varonen et al. |

(56) References Cited

U.S. PATENT DOCUMENTS

| | | |
|---|---|---|
| 2004/0146006 A1 | 7/2004 | Jackson |
| 2004/0181800 A1 | 9/2004 | Rakib et al. |
| 2004/0187159 A1 | 9/2004 | Gaydos et al. |
| 2004/0193609 A1 | 9/2004 | Phan et al. |
| 2004/0193680 A1 | 9/2004 | Gibbs et al. |
| 2004/0224425 A1 | 11/2004 | Gjerde et al. |
| 2004/0240478 A1 | 12/2004 | Goren et al. |
| 2004/0250273 A1 | 12/2004 | Swix et al. |
| 2004/0260798 A1 | 12/2004 | Addington et al. |
| 2004/0261093 A1 | 12/2004 | Rebaud et al. |
| 2004/0268386 A1 | 12/2004 | Logan et al. |
| 2005/0005287 A1 | 1/2005 | Claussen |
| 2005/0007278 A1 | 1/2005 | Anson et al. |
| 2005/0015810 A1 | 1/2005 | Gould et al. |
| 2005/0021985 A1 | 1/2005 | Ono et al. |
| 2005/0022227 A1 | 1/2005 | Shen et al. |
| 2005/0034171 A1 | 2/2005 | Benya |
| 2005/0039205 A1 | 2/2005 | Riedl |
| 2005/0039212 A1 | 2/2005 | Baran et al. |
| 2005/0049886 A1 | 3/2005 | Grannan et al. |
| 2005/0055220 A1 | 3/2005 | Lee et al. |
| 2005/0058112 A1* | 3/2005 | Lahey .......... H04L 41/5067 370/338 |
| 2005/0060742 A1 | 3/2005 | Riedl et al. |
| 2005/0060745 A1 | 3/2005 | Riedl et al. |
| 2005/0065888 A1 | 3/2005 | Benaloh |
| 2005/0086683 A1 | 4/2005 | Meyerson |
| 2005/0086691 A1 | 4/2005 | Dudkiewicz et al. |
| 2005/0091173 A1 | 4/2005 | Alve |
| 2005/0097006 A1 | 5/2005 | Nyako |
| 2005/0108763 A1 | 5/2005 | Baran et al. |
| 2005/0111844 A1 | 5/2005 | Compton et al. |
| 2005/0114686 A1 | 5/2005 | Ball et al. |
| 2005/0114900 A1 | 5/2005 | Ladd et al. |
| 2005/0125832 A1 | 6/2005 | Jost et al. |
| 2005/0138357 A1 | 6/2005 | Swenson et al. |
| 2005/0168323 A1 | 8/2005 | Lenoir et al. |
| 2005/0169468 A1 | 8/2005 | Fahrny et al. |
| 2005/0172127 A1 | 8/2005 | Hartung et al. |
| 2005/0176444 A1 | 8/2005 | Tanaka |
| 2005/0177740 A1 | 8/2005 | Athaide et al. |
| 2005/0177741 A1 | 8/2005 | Chen et al. |
| 2005/0177855 A1 | 8/2005 | Maynard et al. |
| 2005/0182931 A1 | 8/2005 | Robert et al. |
| 2005/0188210 A1 | 8/2005 | Perlin et al. |
| 2005/0190912 A1 | 9/2005 | Hopkins et al. |
| 2005/0195975 A1 | 9/2005 | Kawakita |
| 2005/0198693 A1 | 9/2005 | Choi et al. |
| 2005/0268107 A1 | 12/2005 | Harris et al. |
| 2005/0273629 A1 | 12/2005 | Abrams et al. |
| 2005/0278259 A1 | 12/2005 | Gunaseelan et al. |
| 2005/0289618 A1 | 12/2005 | Hardin |
| 2005/0289619 A1 | 12/2005 | Melby |
| 2006/0002551 A1 | 1/2006 | Brown et al. |
| 2006/0004662 A1 | 1/2006 | Nadalin et al. |
| 2006/0008256 A1 | 1/2006 | Khedouri et al. |
| 2006/0020786 A1 | 1/2006 | Helms et al. |
| 2006/0020950 A1 | 1/2006 | Ladd et al. |
| 2006/0021004 A1 | 1/2006 | Moran et al. |
| 2006/0036750 A1 | 2/2006 | Ladd et al. |
| 2006/0041903 A1 | 2/2006 | Kahn et al. |
| 2006/0047801 A1 | 3/2006 | Haag et al. |
| 2006/0047957 A1 | 3/2006 | Helms et al. |
| 2006/0064583 A1 | 3/2006 | Birnbaum et al. |
| 2006/0095940 A1 | 5/2006 | Yearwood |
| 2006/0130099 A1 | 6/2006 | Rooyen |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0137005 A1 | 6/2006 | Park |
| 2006/0137015 A1 | 6/2006 | Fahrny et al. |
| 2006/0148362 A1 | 7/2006 | Bridges |
| 2006/0149850 A1 | 7/2006 | Bowman |
| 2006/0154674 A1 | 7/2006 | Landschaft et al. |
| 2006/0161635 A1 | 7/2006 | Lamkin et al. |
| 2006/0165090 A1 | 7/2006 | Kalliola et al. |
| 2006/0165197 A1 | 7/2006 | Morita et al. |
| 2006/0168219 A1 | 7/2006 | Ahluwalia et al. |
| 2006/0171390 A1 | 8/2006 | La Joie |
| 2006/0171423 A1 | 8/2006 | Helms et al. |
| 2006/0179138 A1 | 8/2006 | Van Gassel et al. |
| 2006/0184972 A1 | 8/2006 | Rafey et al. |
| 2006/0187900 A1 | 8/2006 | Akbar |
| 2006/0200856 A1 | 9/2006 | Salowey et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0218604 A1 | 9/2006 | Riedl et al. |
| 2006/0218632 A1 | 9/2006 | Corley et al. |
| 2006/0236131 A1 | 10/2006 | Vauclair |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253864 A1 | 11/2006 | Easty |
| 2006/0259927 A1 | 11/2006 | Acharya et al. |
| 2006/0277569 A1 | 12/2006 | Smith |
| 2006/0291506 A1 | 12/2006 | Cain |
| 2007/0011335 A1 | 1/2007 | Burns et al. |
| 2007/0019645 A1 | 1/2007 | Menon |
| 2007/0022459 A1 | 1/2007 | Gaebel, Jr. et al. |
| 2007/0022469 A1 | 1/2007 | Cooper et al. |
| 2007/0033531 A1 | 2/2007 | Marsh |
| 2007/0046791 A1 | 3/2007 | Wang et al. |
| 2007/0049245 A1 | 3/2007 | Lipman |
| 2007/0067851 A1 | 3/2007 | Fernando et al. |
| 2007/0076728 A1 | 4/2007 | Rieger et al. |
| 2007/0079381 A1 | 4/2007 | Hartung et al. |
| 2007/0086383 A1* | 4/2007 | Watanabe .......... H04W 36/0011 370/331 |
| 2007/0089127 A1 | 4/2007 | Flickinger et al. |
| 2007/0094691 A1 | 4/2007 | Gazdzinski |
| 2007/0098178 A1 | 5/2007 | Raikar |
| 2007/0113243 A1 | 5/2007 | Brey |
| 2007/0115900 A1 | 5/2007 | Liang et al. |
| 2007/0121678 A1 | 5/2007 | Brooks et al. |
| 2007/0124488 A1 | 5/2007 | Baum et al. |
| 2007/0157295 A1 | 7/2007 | Mangalore et al. |
| 2007/0174888 A1 | 7/2007 | Rubinstein |
| 2007/0192615 A1 | 8/2007 | Varghese et al. |
| 2007/0195727 A1 | 8/2007 | Kinder et al. |
| 2007/0204314 A1 | 8/2007 | Hasek et al. |
| 2007/0206799 A1 | 9/2007 | Wingert et al. |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0220024 A1 | 9/2007 | Putterman et al. |
| 2007/0233857 A1 | 10/2007 | Cheng et al. |
| 2007/0250872 A1 | 10/2007 | Dua |
| 2007/0250880 A1 | 10/2007 | Hainline |
| 2007/0261116 A1 | 11/2007 | Prafullchandra et al. |
| 2007/0266395 A1 | 11/2007 | Lee et al. |
| 2007/0276925 A1 | 11/2007 | La Joie et al. |
| 2007/0276926 A1 | 11/2007 | Lajoie et al. |
| 2007/0294178 A1 | 12/2007 | Pinder et al. |
| 2008/0008321 A1 | 1/2008 | Gagnon et al. |
| 2008/0008371 A1 | 1/2008 | Woods et al. |
| 2008/0021836 A1 | 1/2008 | Lao |
| 2008/0022012 A1 | 1/2008 | Wang |
| 2008/0037493 A1 | 2/2008 | Morton |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0101460 A1 | 5/2008 | Rodriguez |
| 2008/0103976 A1 | 5/2008 | Read et al. |
| 2008/0103977 A1 | 5/2008 | Khosravy et al. |
| 2008/0104634 A1 | 5/2008 | Gajdos et al. |
| 2008/0109307 A1 | 5/2008 | Ullah |
| 2008/0112405 A1 | 5/2008 | Cholas et al. |
| 2008/0117920 A1 | 5/2008 | Tucker |
| 2008/0123862 A1 | 5/2008 | Rowley |
| 2008/0133551 A1 | 6/2008 | Wensley et al. |
| 2008/0134274 A1 | 6/2008 | Derrenberger et al. |

(56) References Cited

U.S. PATENT DOCUMENTS

| | | |
|---|---|---|
| 2008/0141317 A1 | 6/2008 | Radloff et al. |
| 2008/0141353 A1 | 6/2008 | Brown |
| 2008/0148362 A1 | 6/2008 | Gilder et al. |
| 2008/0155059 A1 | 6/2008 | Hardin et al. |
| 2008/0155614 A1 | 6/2008 | Cooper et al. |
| 2008/0162353 A1 | 7/2008 | Tom et al. |
| 2008/0165460 A1 | 7/2008 | Whitby-Strevens |
| 2008/0177998 A1 | 7/2008 | Apsangi et al. |
| 2008/0182591 A1 | 7/2008 | Krikorian |
| 2008/0183705 A1 | 7/2008 | Shivaji-Rao et al. |
| 2008/0192820 A1 | 8/2008 | Brooks et al. |
| 2008/0212945 A1 | 9/2008 | Khedouri et al. |
| 2008/0222684 A1 | 9/2008 | Mukraj et al. |
| 2008/0229354 A1 | 9/2008 | Morris et al. |
| 2008/0235746 A1 | 9/2008 | Peters et al. |
| 2008/0244667 A1 | 10/2008 | Osborne |
| 2008/0256510 A1 | 10/2008 | Auerbach |
| 2008/0270307 A1 | 10/2008 | Olson et al. |
| 2008/0273591 A1 | 11/2008 | Brooks et al. |
| 2008/0282299 A1 | 11/2008 | Koat et al. |
| 2008/0288618 A1 | 11/2008 | Vardi et al. |
| 2009/0007234 A1 | 1/2009 | Birger et al. |
| 2009/0013210 A1 | 1/2009 | McIntosh et al. |
| 2009/0025027 A1 | 1/2009 | Craner |
| 2009/0025075 A1 | 1/2009 | Chow et al. |
| 2009/0028182 A1 | 1/2009 | Brooks et al. |
| 2009/0031371 A1 | 1/2009 | Munsell et al. |
| 2009/0064251 A1 | 3/2009 | Savoor et al. |
| 2009/0077620 A1 | 3/2009 | Ravi et al. |
| 2009/0083813 A1 | 3/2009 | Dolce et al. |
| 2009/0094648 A1 | 4/2009 | Patel et al. |
| 2009/0098861 A1 | 4/2009 | Kalliola et al. |
| 2009/0100459 A1 | 4/2009 | Riedl et al. |
| 2009/0102983 A1 | 4/2009 | Malone et al. |
| 2009/0119751 A1 | 5/2009 | Koga |
| 2009/0125374 A1 | 5/2009 | Deaton et al. |
| 2009/0151006 A1 | 6/2009 | Saeki et al. |
| 2009/0170479 A1 | 7/2009 | Jarenskog |
| 2009/0182815 A1 | 7/2009 | Czechowski, III et al. |
| 2009/0185576 A1 | 7/2009 | Kisel et al. |
| 2009/0187939 A1 | 7/2009 | Lajoie |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas et al. |
| 2009/0225760 A1 | 9/2009 | Foti |
| 2009/0244290 A1 | 10/2009 | McKelvey et al. |
| 2009/0265750 A1 | 10/2009 | Jones et al. |
| 2009/0282241 A1 | 11/2009 | Prafullchandra et al. |
| 2009/0282449 A1 | 11/2009 | Lee |
| 2009/0292922 A1 | 11/2009 | Park |
| 2009/0293101 A1 | 11/2009 | Carter et al. |
| 2010/0014496 A1 | 1/2010 | Kalika et al. |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0070867 A1 | 3/2010 | Lemmers |
| 2010/0081416 A1 | 4/2010 | Cohen |
| 2010/0082983 A1 | 4/2010 | Shah et al. |
| 2010/0083329 A1 | 4/2010 | Joyce et al. |
| 2010/0088236 A1 | 4/2010 | Karabulut et al. |
| 2010/0088292 A1 | 4/2010 | Tirpak et al. |
| 2010/0106846 A1 | 4/2010 | Noldus et al. |
| 2010/0122288 A1 | 5/2010 | Minter et al. |
| 2010/0131973 A1 | 5/2010 | Dillon et al. |
| 2010/0138900 A1 | 6/2010 | Peterka et al. |
| 2010/0150027 A1 | 6/2010 | Atwal et al. |
| 2010/0151816 A1 | 6/2010 | Besehanic et al. |
| 2010/0159951 A1 | 6/2010 | Shkedi |
| 2010/0167743 A1 | 7/2010 | Palanki et al. |
| 2010/0169977 A1 | 7/2010 | Dasher et al. |
| 2010/0185855 A1 | 7/2010 | Margolus et al. |
| 2010/0198888 A1 | 8/2010 | Blomstedt et al. |
| 2010/0217837 A1 | 8/2010 | Ansari et al. |
| 2010/0251305 A1 | 9/2010 | Kimble et al. |
| 2010/0287609 A1 | 11/2010 | Gonzalez et al. |
| 2010/0309051 A1 | 12/2010 | Moshfeghi |
| 2010/0312826 A1 | 12/2010 | Sarosi et al. |
| 2010/0313225 A1 | 12/2010 | Cholas et al. |
| 2010/0313226 A1 | 12/2010 | Cholas et al. |
| 2011/0015989 A1 | 1/2011 | Tidwell et al. |
| 2011/0071841 A1 | 3/2011 | Fomenko et al. |
| 2011/0078721 A1 | 3/2011 | Wang et al. |
| 2011/0093900 A1 | 4/2011 | Patel et al. |
| 2011/0103374 A1 | 5/2011 | Lajoie et al. |
| 2011/0107389 A1 | 5/2011 | Chakarapani |
| 2011/0112717 A1 | 5/2011 | Resner |
| 2011/0116428 A1 | 5/2011 | Seong et al. |
| 2011/0138064 A1 | 6/2011 | Rieger et al. |
| 2011/0163888 A1 | 7/2011 | Goedde |
| 2011/0164753 A1 | 7/2011 | Dubhashi et al. |
| 2011/0167440 A1 | 7/2011 | Greenfield |
| 2011/0169977 A1 | 7/2011 | Masuda |
| 2011/0197070 A1 | 8/2011 | Mizrah |
| 2011/0206136 A1 | 8/2011 | Bekedam et al. |
| 2011/0213688 A1 | 9/2011 | Santos et al. |
| 2011/0219229 A1 | 9/2011 | Cholas et al. |
| 2011/0225619 A1 | 9/2011 | Kesireddy et al. |
| 2011/0235577 A1 | 9/2011 | Hintermeister et al. |
| 2011/0247029 A1 | 10/2011 | Yarvis et al. |
| 2011/0252236 A1 | 10/2011 | De Atley et al. |
| 2011/0252243 A1 | 10/2011 | Brouwer et al. |
| 2011/0286437 A1 | 11/2011 | Austin et al. |
| 2011/0299422 A1* | 12/2011 | Kim .................. H04W 48/16 370/253 |
| 2012/0008786 A1 | 1/2012 | Cronk et al. |
| 2012/0011567 A1 | 1/2012 | Cronk et al. |
| 2012/0023535 A1 | 1/2012 | Brooks et al. |
| 2012/0030716 A1 | 2/2012 | Zhang et al. |
| 2012/0046049 A1 | 2/2012 | Curtis et al. |
| 2012/0054785 A1 | 3/2012 | Yang et al. |
| 2012/0079531 A1 | 3/2012 | Hasek et al. |
| 2012/0079546 A1 | 3/2012 | Kalidindi et al. |
| 2012/0115501 A1 | 5/2012 | Zheng |
| 2012/0151549 A1 | 6/2012 | Kumar et al. |
| 2012/0159603 A1 | 6/2012 | Queck |
| 2012/0167173 A1 | 6/2012 | Nadalin et al. |
| 2012/0202447 A1 | 8/2012 | Edge et al. |
| 2012/0203822 A1 | 8/2012 | Floyd et al. |
| 2012/0222081 A1 | 8/2012 | Schaefer et al. |
| 2012/0278654 A1 | 11/2012 | Shen et al. |
| 2012/0291062 A1 | 11/2012 | Pearson et al. |
| 2012/0302259 A1 | 11/2012 | Busch |
| 2012/0330759 A1 | 12/2012 | Aggarwal et al. |
| 2013/0016648 A1 | 1/2013 | Koskela et al. |
| 2013/0017794 A1 | 1/2013 | Kloper et al. |
| 2013/0045681 A1 | 2/2013 | Dua |
| 2013/0046623 A1 | 2/2013 | Moritz et al. |
| 2013/0081097 A1 | 3/2013 | Park et al. |
| 2013/0095848 A1 | 4/2013 | Gold et al. |
| 2013/0100818 A1 | 4/2013 | Qiu et al. |
| 2013/0132789 A1 | 5/2013 | Watford et al. |
| 2013/0145152 A1 | 6/2013 | Maino et al. |
| 2013/0176885 A1 | 7/2013 | Lee et al. |
| 2013/0235774 A1 | 9/2013 | Jo et al. |
| 2013/0254787 A1 | 9/2013 | Cox et al. |
| 2013/0260820 A1 | 10/2013 | Schmandt et al. |
| 2013/0308622 A1 | 11/2013 | Uhlik |
| 2013/0317892 A1 | 11/2013 | Heerboth |
| 2013/0347089 A1 | 12/2013 | Bailey et al. |
| 2014/0010219 A1 | 1/2014 | Dor et al. |
| 2014/0046624 A1 | 2/2014 | Miettinen |
| 2014/0066098 A1 | 3/2014 | Stern et al. |
| 2014/0177611 A1 | 6/2014 | Corrales Lopez |
| 2014/0213256 A1 | 7/2014 | Meylan et al. |
| 2014/0215506 A1 | 7/2014 | Kalmes et al. |
| 2014/0242991 A1 | 8/2014 | Yanover et al. |
| 2014/0274110 A1 | 9/2014 | Mehta et al. |
| 2014/0280901 A1 | 9/2014 | Balachandran et al. |
| 2014/0281489 A1 | 9/2014 | Peterka et al. |
| 2014/0282721 A1 | 9/2014 | Kuncl et al. |
| 2014/0283137 A1 | 9/2014 | Rebaud et al. |
| 2014/0308923 A1* | 10/2014 | Faulkner .............. H04W 48/20 455/411 |
| 2014/0309868 A1 | 10/2014 | Ricci |

(56) References Cited

U.S. PATENT DOCUMENTS

| | | | |
|---|---|---|---|
| 2014/0328257 A1 | 11/2014 | Kamlani | |
| 2014/0359649 A1 | 12/2014 | Cronk et al. | |
| 2015/0009869 A1* | 1/2015 | Clegg | H04L 5/0062 370/278 |
| 2015/0036514 A1 | 2/2015 | Zhu et al. | |
| 2015/0058883 A1 | 2/2015 | Tidwell et al. | |
| 2015/0058909 A1 | 2/2015 | Miller et al. | |
| 2015/0094098 A1 | 4/2015 | Stern et al. | |
| 2015/0103685 A1 | 4/2015 | Butchko et al. | |
| 2015/0106501 A1 | 4/2015 | Malets et al. | |
| 2015/0106846 A1 | 4/2015 | Chen et al. | |
| 2015/0146537 A1 | 5/2015 | Panaitopol et al. | |
| 2015/0156129 A1 | 6/2015 | Tsuruoka | |
| 2015/0189377 A1 | 7/2015 | Wheatley et al. | |
| 2015/0288617 A1 | 10/2015 | Dasher et al. | |
| 2015/0288732 A1 | 10/2015 | Phillips et al. | |
| 2015/0305082 A1 | 10/2015 | Elliott et al. | |
| 2015/0334625 A1 | 11/2015 | Banks et al. | |
| 2015/0365833 A1 | 12/2015 | Stafford et al. | |
| 2016/0019103 A1 | 1/2016 | Basra | |
| 2016/0057794 A1 | 2/2016 | Morita | |
| 2016/0066234 A1 | 3/2016 | Cho et al. | |
| 2016/0119939 A1 | 4/2016 | Himayat et al. | |
| 2016/0127185 A1 | 5/2016 | McAllister et al. | |
| 2016/0242071 A1 | 8/2016 | Chen et al. | |
| 2016/0301525 A1 | 10/2016 | Canard et al. | |
| 2017/0099327 A1 | 4/2017 | Negalaguli et al. | |
| 2017/0164378 A1 | 6/2017 | Gunasekara et al. | |
| 2017/0164416 A1 | 6/2017 | Yeddala et al. | |
| 2017/0223536 A1 | 8/2017 | Gupta et al. | |
| 2017/0257750 A1 | 9/2017 | Gunasekara et al. | |
| 2017/0265084 A1 | 9/2017 | Clegg | |

FOREIGN PATENT DOCUMENTS

| | | |
|---|---|---|
| GB | 2381709 A | 5/2003 |
| JP | H08263440 A | 10/1996 |
| JP | 2000156676 A | 6/2000 |
| JP | 2000332746 A | 11/2000 |
| JP | 2001243707 A | 9/2001 |
| JP | 2001274786 A | 10/2001 |
| JP | 2001274788 A | 10/2001 |
| JP | 2001285821 A | 10/2001 |
| JP | 2002163396 A | 6/2002 |
| JP | 2002352094 A | 12/2002 |
| JP | 2003058657 A | 2/2003 |
| JP | 2003162600 A | 6/2003 |
| JP | 2003233690 A | 8/2003 |
| JP | 2003248508 A | 9/2003 |
| JP | 2003296484 A | 10/2003 |
| JP | 2003348508 A | 12/2003 |
| JP | 2004030111 A | 1/2004 |
| JP | 2004072721 A | 3/2004 |
| JP | 2004120736 A | 4/2004 |
| JP | 2004120738 A | 4/2004 |
| JP | 2004303111 A | 10/2004 |
| JP | 2005506627 A | 3/2005 |
| JP | 2005519365 A | 6/2005 |
| JP | 2005519501 A | 6/2005 |
| JP | 2005339093 A | 12/2005 |
| JP | 2006185473 A | 7/2006 |
| JP | 2006311267 A | 11/2006 |
| JP | 2007020144 A | 1/2007 |
| JP | 2008005047 A | 1/2008 |
| JP | 2008015936 A | 1/2008 |
| JP | 2008021293 A | 1/2008 |
| JP | 2008507905 A | 3/2008 |
| JP | 2008167018 A | 7/2008 |
| JP | 2008186272 A | 8/2008 |
| JP | 2008206039 A | 9/2008 |
| JP | 2009071786 A | 4/2009 |
| JP | 2009515238 A | 4/2009 |
| JP | 2009176060 A | 8/2009 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO-0103410 A1 | 1/2001 |
| WO | WO-0110125 A1 | 2/2001 |
| WO | WO-0137479 A1 | 5/2001 |
| WO | WO-0169842 A1 | 9/2001 |
| WO | WO-0177778 A2 | 10/2001 |
| WO | WO-0213032 A1 | 2/2002 |
| WO | WO-0221841 A1 | 3/2002 |
| WO | WO-0242966 A1 | 5/2002 |
| WO | WO-02080556 A1 | 10/2002 |
| WO | WO-03038704 A1 | 5/2003 |
| WO | WO-03087799 A1 | 10/2003 |
| WO | WO-03093944 A2 | 11/2003 |
| WO | WO-2004027622 A2 | 4/2004 |
| WO | WO-2005015422 A1 | 2/2005 |
| WO | WO-2006020141 A2 | 2/2006 |
| WO | WO-2008080556 A1 | 7/2008 |
| WO | WO-2009020476 A2 | 2/2009 |
| WO | WO-2012021245 A1 | 2/2012 |

OTHER PUBLICATIONS

Cantor, et al., Assertions and Protocols for the OASIS Security Assertion Markup Language (SAML) V2.0, OASIS Standard, Mar. 15, 2005. Document ID: saml-core-2.0-os (http://docs.oasis-open.org/security/saml/v2.0/saml-core-2.0-os.pdf).

Cantor, et al., Bindings for the OASIS Security Assertion Markup Language (SAML) V2.0, OASIS Standard, Mar. 2005, Document ID saml-bindings-2.0-os ,(http://docs.oasis-open.org/security/saml/v2.0/saml-bindings-2.0-os.pdf).

Cisco Intelligent Network Architecture for Digital Video—SCTE Cable-Tec Expo 2004 information page, Orange County Convention Center, Jun. 2004, 24 pages.

DCAS Authorized Service Domain, Version 1.2, dated Nov. 4, 2008, 58 pages.

DCAS Licensed Specification Abstracts, CableLabs Confidential Information, Jan. 12, 2006, 4 pages.

Deering et al., Internet Protocol, Version 6 (Ipv6) Specification, IETF RFC 2460 (Dec. 1998).

Digital Video Broadcasting (DVB); DVB SimulCrypt; Part 1: "Head-end architecture and synchronization" Technical Specification—ETSI TS 101 197 V1.2.1 (Feb. 2002), 40 pages.

DVB (Digital Video Broadcasting), DVB Document A045 Rev. 3, Jul. 2004, "Head-end Implementation of SimulCrypt," 289 pages.

Federal Information Processing Standards Publication, US FIPS PUB 197, Nov. 26, 2001, "Advanced Encryption Standards (AES)," 47 pages.

Gomez, Conserving Transmission Power in Wireless Ad Hoc Networks, 2001, Network Protocols.

Gupta V., et al., "Bit-Stuffing in 802.11 Beacon Frame: Embedding Non-Standard Custom Information," International Journal of Computer Applications, Feb. 2013, vol. 63 (2), pp. 6-12.

High-bandwidth Digital Content Protection System, Revision 1.091, dated Apr. 22, 2003, Digital Content Protection LLC Draft, 78 pages.

Internet Protocol DARPA Internet Program Protocol Specification, IETF RFC 791 (Sep. 1981).

Kanouff, Communications Technology: Next-Generation Bandwidth Management—The Evolution of the Anything-to-Anywhere Network, 8 pages, Apr. 1, 2004.

Marusic, et al., "Share it!—Content Transfer in Home-to-Home Networks." IEEE MELECON 2004, May 12-15, 2004, Dubrovnik, Croatia.

Media Server; 1 Device Template Version 1.01 Jun. 25, 2002.

Miao, et al., "Distributed interference-aware energy-efficient power optimization," IEEE Transactions on Wireless Communications, Apr. 2011, vol. 10 (4), pp. 1323-1333.

OpenCable Application Platform Specification, OCAP 2.0 Profile, OC-SP-OCAP2.0-I01-020419, Apr. 19, 2002.

OpenCable Application Platform Specifications, OCAP Extensions, OC-SP-OCAP—HNEXT-I03-080418, 2005-2008.

(56) References Cited

OTHER PUBLICATIONS

OpenCable Host Device, Core Functional Requirements, OC-SP-HOST-CFR-I13-030707, Jul. 7, 2003.
OpenCable, HOST-POD Interface Specification, OC-SP-HOSTPOD-IF-I13-030707, Jul. 7, 2003.
OpenCable Specification, Home Networking Protocol 2.0, OC-SP-HNP2.0-I01-08418, 2007.
OpenCable Specifications, Home Networking Security Specification, OC-SP-HN-SEC-DO1-081027, draft (Oct. 27, 2008).
OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).
Primergy BX300 Switch Blade user's manual, Fujitsu Corp., Sep. 30, 2002, first edition, pp. 1 to 20.
Real System Media Commerce Suite (Technical White Paper), at http://docs.real.com/docs/drm/DRM.sub-WP1.pdf, 12 pages, Nov. 2001.
Van Moffaert, A., et al. ("Digital Rights Management: DRM is a key enabler for the future growth of the broadband access market and the telecom/networking market in general", Alcatel Telecommunications Review, Alcatel, Paris Cedex FR, Apr. 1, 2003, XP007005930ISSN; 8 pages.
Zhang, et al., "A Flexible Content Protection System for Media-On-Demand" Multimedia Software Engineering, 2002 Proceedings. Fourth International Symposium on Dec. 11-13, 2002, Piscataway, NJ, USAA, IEEE, Dec. 11, 2002, pp. 272-277, XP010632760ISBN: 978-0-7695-1857-2.
Griffith, et al.,Resource Planning and Bandwidth Allocation in Hybrid Fiber-Coax Residential Networks, National Institute of Standards and Technology (NIST), 10 pages, no date.
Motorola DOCSIS Cable Module DCM 2000 specifications, 4 pages, copyright 2001.
OpenVision Session Resource Manager features and information, 2 pages, no date, (http://www.imake.com/hopenvision).

\* cited by examiner

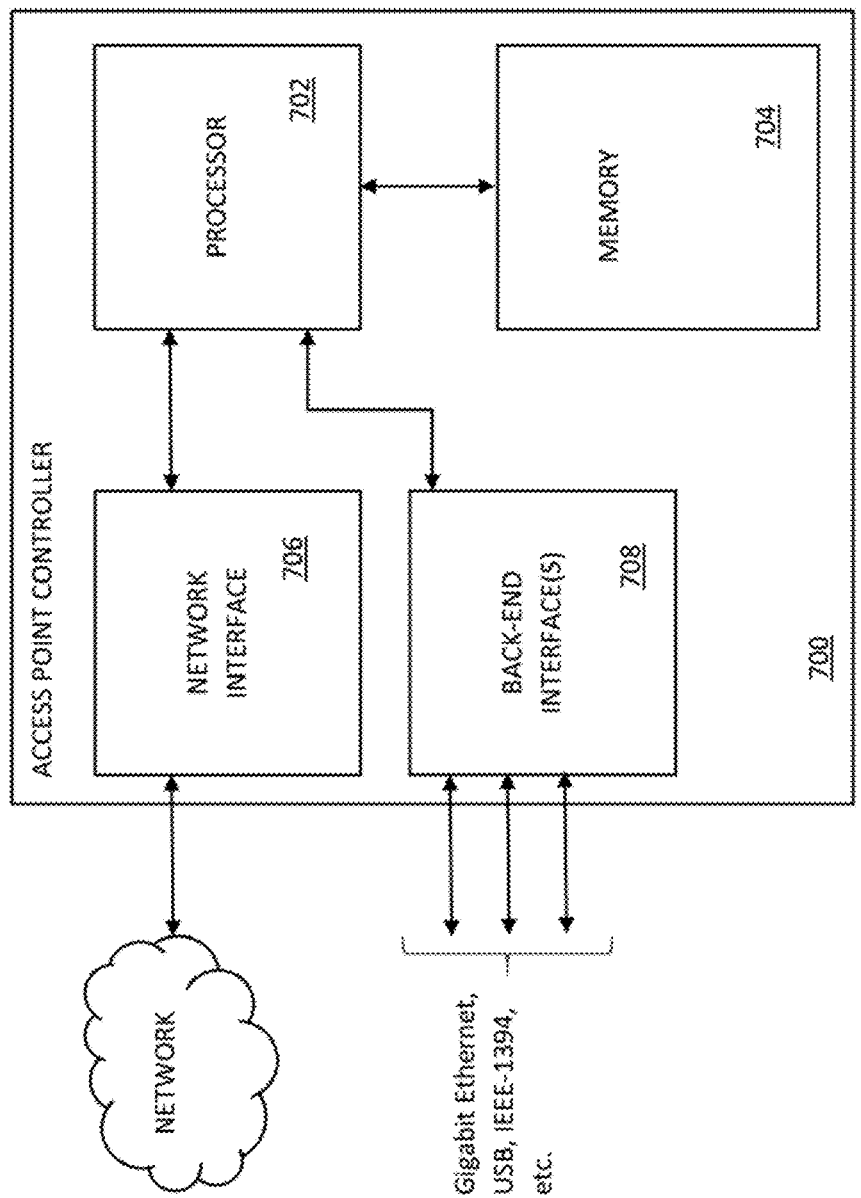

APPARATUS AND METHOD FOR WIRELESS NETWORK SERVICES IN MOVING VEHICLES

PRIORITY AND RELATED APPLICATIONS

This application is a continuation of and claims the benefit of priority to co-owned U.S. patent application Ser. No. 15/002,232 of the same title filed on Jan. 20, 2016, issued as U.S. Pat. No. 9,918,345 on Mar. 13, 2018, which is incorporated herein by reference in its entirety. The present application is generally related to the subject matter of co-pending and co-owned U.S. patent application Ser. No. 14/959,948 filed on Dec. 4, 2015 and entitled "APPARATUS AND METHOD FOR WIRELESS NETWORK EXTENSIBILITY AND ENHANCEMENT", Ser. No. 14/959,885 filed on Dec. 4, 2015 and entitled "APPARATUS AND METHODS FOR SELECTIVE DATA NETWORK ACCESS", Ser. No. 14/534,067 filed Nov. 5, 2014 and entitled "METHODS AND APPARATUS FOR DETERMINING AN OPTIMIZED WIRELESS INTERFACE INSTALLATION CONFIGURATION", and Ser. No. 14/302,313 filed Jun. 11, 2014 and entitled "METHODS AND APPARATUS FOR ACCESS POINT LOCATION", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks, and specifically in one implementation, to apparatus and methods for providing wireless network coverage within vehicles or other moving objects. Various disclosed embodiments extend and enhance wireless network systems to inter alia, accommodate the dynamic and fluid requirements of vehicular and/or other mobile network connectivity.

2. Description of Related Technology

Wireless networking technologies enable wireless devices to connect to one another. One common application for wireless technology is to provide network access to devices that are within a coverage area of a wireless network (e.g., WLAN, or wireless LAN) that is connected to the Internet. One such technology is Wi-Fi™ (IEEE Std. 802.11), which has become the de facto standard for wireless networking in consumer electronics. Wi-Fi enables multiple interconnected Access Points (APs, also commonly referred to as "hotspots") to provide coverage areas ranging from those as small as local coffee shops or residences, to entire corporate and academic campuses.

Commercially, Wi-Fi provides high value services in, for example, airports, hotels, and restaurants. Businesses and/or promotional events often provide Internet service to attract customers. Artisans of ordinary skill in the related arts will readily appreciate that typical wireless APs have an effective connectivity range on the order of one hundred (100) feet, depending on factors such as the presence or absence of buildings or other structures (and their materials of construction), and other interfering emitters.

Large coverage areas can be formed by grouping together a number of APs with overlapping coverage.

Vehicular Wi-Fi is a current area of interest for network providers. Existing solutions for vehicular Wi-Fi hotspots are coupled to either a satellite or cellular network for backhaul access. Unfortunately, while satellite and cellular networks can provide service over large coverage areas, they offer significantly less bandwidth than Wi-Fi. For example, practical implementations of existing cell technology cannot support more than 50 Mbps in the downlink and 20 Mbps in the uplink direction; in contrast, Wi-Fi supports 200 Mbps in the downlink and 50 Mbps in the uplink. Satellite technology provides even lower data rates than cellular. Consequently, satellite/cellular backhauls have inherent data bottlenecks that significantly limit the end user experience e.g., browsing videos, surfing the Internet, etc. This problem is exacerbated in multi-user environments; e.g., when multiple users (e.g., passengers) within the vehicle are each attempting to access external networks via a common (vehicular-centric) interface such as an LTE modem built into the vehicles infotainment or telematics system. Multiple passengers are each vying for access to the common, limited bandwidth "data pipe" (such as via their respective smartphones/tablets), as is the vehicle telematics system for functions such as navigation imagery, streaming Internet music, concierge services, etc.

Moreover, from a service provider perspective, both satellite and cellular networks are very expensive to deploy, upgrade, and maintain.

From a consumer standpoint, existing solutions for vehicular Wi-Fi that require a cellular/satellite backhaul provide marginal benefits (if any) over e.g., direct cellular network connectivity (such as e.g., LTE), and often require a subscription service to the more expensive backhaul networks, when compared to the relatively cheaper services of e.g., in-home cable network data services.

Moreover, users riding in vehicles are often rendered wholly or partly "unproductive" by virtue of limited bandwidth of the cellular/satellite backhaul, spotty coverage or dropouts, etc. Millions of person-hours are wasted each year in the U.S. by people riding in vehicles (especially when stuck in traffic or the like) who could otherwise be productive if high-bandwidth service was in fact available to them.

To these ends, solutions are needed to extend and enhance wireless network coverage within moving vehicles. Specifically, solutions and improvements would enable network providers to support Wi-Fi bandwidths within vehicles, preferably with minimal outlays of capital and/or network infrastructure, and with substantial flexibility.

SUMMARY

The present disclosure addresses the foregoing needs by providing, inter alia, methods and apparatus for providing wireless network coverage within vehicles and/or other forms of mobile network connectivity.

In one aspect of the disclosure, a method performed via a stationary access point for operating a wireless network is provided. In one embodiment, the method includes: managing a first wireless local area network (WLAN) connection to a mobile access point that services a client device via a second WLAN connection; communicating data between the mobile access point and a service provider via the first WLAN connection; and causing the mobile access point to communicate the data to the client device via the second WLAN connection.

In one variant, the service provider includes a managed network operator, the data includes first data, and the method further includes: managing a third WLAN connection to a downstream access point; and communicating second data between the downstream access point and a second service provider via the third WLAN connection concurrently with communicating the first data between the mobile access point and the managed network operator via the first WLAN connection. In one implementation, the mobile access point includes a first mobile access point, the client device includes a first client device, the downstream access point includes a second mobile access point that services at least one of the first client device or a second client device, and the method further includes: causing the second mobile access point to communicate the second data to the second client device via the third WLAN connection. The first mobile access point and the second mobile access point have at least one common service set identifier (SSID). The downstream access point includes another stationary access point.

In another variant, the method includes communicating the data between the mobile access point and the service provider via the first WLAN connection and a wired connection managed at least in part by the service provider. The method can also include providing a third WLAN connection to an upstream access point and communicating the data between the mobile access point and the service provider via the first WLAN connection and the third WLAN connection.

In another aspect, a method of operating a wireless network having at least a mobile access point is provided. In one embodiment, the method includes: managing a first Wi-Fi connection to a stationary access point; managing a second Wi-Fi connection to a client device; and communicating data between the client device and a service provider network via the first Wi-Fi connection and the second Wi-Fi connection. The mobile access point and the client device can be located on or within a land-mobile vehicle. The data may include data originally configured for communication over a cellular network.

In one variant, the stationary access point is in data communication with a second stationary access point via a third Wi-Fi connection, and the method further includes communicating the data between the client device and the service provider network via the first Wi-Fi connection, the second Wi-Fi connection, and the third Wi-Fi connection.

In another variant, the stationary access point is connected to the service provider network via a wired connection, and the method includes communicating the data between the client device and the service provider network via the first Wi-Fi connection, the second Wi-Fi connection, and the wired connection.

In a further variant, the method further includes: establishing a third Wi-Fi connection to a second stationary access point; terminating the first Wi-Fi connection to the stationary access point; and communicating data between the client device and the service provider via the second Wi-Fi connection and the third Wi-Fi connection. The method may also include: scanning for access points that are in range of the mobile access point and that are not in wireless connection with the mobile access point; and establishing the third Wi-Fi connection to the second stationary access point based at least on the scanning. The first stationary access point may be associated with a first service set identifier (SSID), and the second stationary access point may be associated with a second, different SSID.

In yet another variant, the method further includes: managing throughput of the data communicated between the client device and the service provider based on signal conditions of the first Wi-Fi connection to the stationary access point. In another implementation, the method further includes: managing throughput of the data communicated between the client device and the service provider based on transit speed of the mobile access point.

In still another variant, the method further includes: receiving configuration information from the stationary access point; performing configuration of the mobile access point according to the configuration information; and maintaining the configuration of the mobile access point until a next power recycle of the mobile access point. The method may also include: authenticating with a backhaul network via the first Wi-Fi connection to the stationary access point for access to the backhaul network; and communicating the data between the client device and the service provider via the backhaul network. The method may further include: receiving, from the client device via the second Wi-Fi connection, payment information for connecting to a backhaul network associated with the stationary access point; and after receiving the payment information, communicating the data between the client device and the service provider via the first Wi-Fi connection and the second Wi-Fi connection. Additionally, the method may include communicating second data between a second client device and a second service provider via the first Wi-Fi connection and a third Wi-Fi connection concurrently with communicating the first data between the first client device and the first content provider via the first Wi-Fi connection and the second Wi-Fi connection.

In another aspect, system for use within a wireless network is disclosed. In one embodiment, the system apparatus includes: a plurality of stationary access points, each of the plurality of stationary access points configured to effectuate a respective Wi-Fi connection to one or more respective mobile access points, and to communicate data between the one or more respective mobile access points and a respective service provider via the respective Wi-Fi connection; wherein a first stationary access point of the plurality of stationary access points is configured to effectuate a wired connection to a network, and to communicate data between the respective mobile access point and the respective content provider via the respective Wi-Fi connection and the wired connection to the network; and wherein a second stationary access point of the plurality of stationary access points is configured to effectuate a Wi-Fi connection to the first stationary access point, the second stationary access point configured to communicate data between the respective mobile access point and the respective service provider via at least the respective Wi-Fi connection to the mobile access point, the Wi-Fi connection to the first stationary access point, and the wired connection to the network.

In another aspect of the present disclosure, a computerized device is disclosed. In one embodiment, the computerized device is configured to operate within a wireless network, and the computerized device includes: a backhaul interface configured to transact digital data with a plurality of access points; a client interface configured to transact the digital data with one or more client devices; and a non-transitory computer-readable storage medium having at least one computer program stored thereon, the at least one computer program comprising a plurality of instructions configured to, when executed by a processor apparatus, cause the computerized device to: establish a first wireless data connection with a first access point when the computerized device is disposed in a first location; establish a second wireless data connection with a client device; and responsive to a first signal quality parameter associated with the first one of the plurality of access points falling below a threshold, establish a third wireless data connection with a second one of the plurality of access points, and terminate the first wireless data connection with the first one of the plurality of access points.

In one variant, each of the plurality of access points is in data communication with a network entity of the wireless network.

In another variant, the establishment of the third wireless data connection and the termination of the first wireless data connection are configured to occur in response to the computerized device moving from the first location to a second location, the second location corresponding to a different signal quality than the first signal quality parameter associated with the first one of the plurality of access points. In another aspect of the present disclosure, a method of operating a wireless network is disclosed. In one embodiment, the method is a computerized method that includes: establishing a first wireless data connection with a backhaul access point; providing wireless connectivity coverage for one or more computerized client devices, the wireless connectivity coverage including one or more second wireless data connections; providing digital data to the one or more computerized client devices from the backhaul access point via respective ones of the one or more second wireless data connections; monitoring a link quality associated with the first wireless data connection with the backhaul access point; and causing the backhaul access point to initiate a third wireless data connection with another backhaul access point, the causing based at least on determining that the third wireless data connection with the other backhaul access point is available.

In one variant, the third wireless connection is associated with a link quality greater than the link quality associated with the first wireless data connection.

In another variant, the other backhaul access point is in data communication with the backhaul access point.

In another aspect of the present disclosure, a non-transitory computer-readable medium is disclosed. In one embodiment, the non-transitory computer-readable medium includes a storage apparatus having at least one computer program stored thereon, the at least one computer program comprising a plurality of instructions configured to, when executed by a processor apparatus, cause a network apparatus to: establish a first backhaul connection with a first access point; establish a wireless data connection with a client device; when the network apparatus moves from a first location to a second location, establish a second backhaul connection with a second access point; and when the network apparatus moves from the second location to a third location, establish a third backhaul connection with a third access point.

In one variant, the network apparatus is associated with a persistent identifier configured to allow the network apparatus to maintain the wireless data connection with the client device when the network apparatus moves from the second location to the third location, the wireless data connection being configured to enable data communication between the client device and one or more of: the first network or the second network.

These and other aspects shall become apparent when considered in light of the disclosure provided herein.

BRIEF DESCRIPTION OF THE DRAWINGS

FIG. 7 is a functional block diagram of one embodiment of an Access Point (AP) controller apparatus according to the present disclosure.

Figure 1:
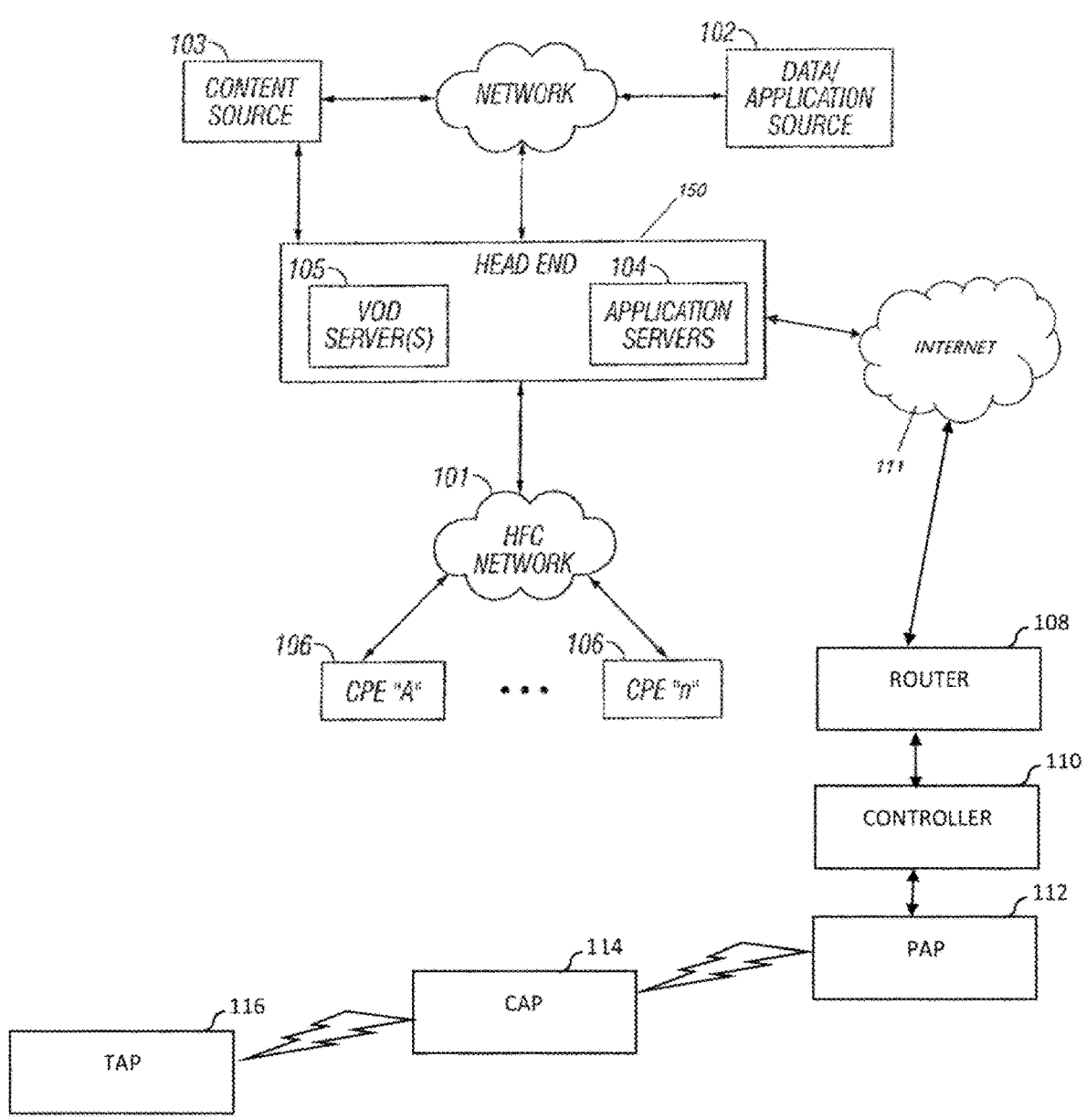
FIG. 1 is a functional block diagram illustrating an exemplary hybrid fiber network configuration useful with various aspects of the present disclosure.

All figures © Copyright 2016 Time Warner Enterprises LLC. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), Zigbee®, Z-wave, PAN (e.g., 802.15), power line carrier (PLC), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information. As used herein, the term "Wi-Fi" refers to, without limitation, any of the variants of IEEE-Std. 802.11 or related standards including 802.11 a/b/g/n/s/v/ac or 802.11-2012, each of the foregoing incorporated herein by reference in its entirety.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one aspect of the present disclosure, a wireless network of access points provides backhaul access connectivity to e.g., a vehicular hotspot or series of hotspots. The wireless network of access points includes so-called "parent access points" (PAPs), "child access points" (CAPs), and "transit access points" (TAPs). Each PAP operates as a service gateway and provides a wireless coverage area, which is further augmented by the coverages of its subsidiary CAPs. Each TAP can connect to either a PAP or a CAP for backhaul access. During exemplary operation, a subscriber's Wi-Fi client device connects to a TAP located in the vehicle (e.g., car, train, bus, etc.) As described in greater detail hereinafter, the TAP roams between PAP and/or CAP coverage as the vehicle moves.

Various embodiments of the present disclosure provide improved throughput via the Wi-Fi backhaul (when compared to mobile satellite/cellular alternatives), and reduce reception overhead for the typically smaller, less powerful Wi-Fi client devices. Instead, throughput for Wi-Fi users in one implementation of the disclosure is based on the signal conditions between the TAP and its respective backhaul access point (PAP or CAP). Vehicular TAPs can be optimized for maximum visibility and can implement more aggressive reception techniques due to fewer power constraints, thereby providing better throughput than the client devices would otherwise be capable of Still further, multiple users can simultaneously arbitrate for, and use the Wi-Fi service without caps on the throughput speeds, subject to the TAP's constraints. Artisans of ordinary skill in the related arts will readily appreciate, given the contents of the present disclosure, that the Wi-Fi client devices are stationary relative to the TAP; accordingly, certain mobility management functions can be greatly reduced/obviated. For example, a Wi-Fi client device does not experience a disruption in service during handover operation (the TAP transparently manages backhaul access to nearby PAPs/CAPs).

Various business considerations are discussed in greater detail herein. In one aspect of the present disclosure, vehicular access is monetized via an overarching service provider's accounting infrastructure; for example, a network subscriber of cable service at home may also receive the added benefits of vehicular accessibility. In some cases, an AP may be registered in several multiple system operator (MSO) networks, thereby allowing the AP to seamlessly move between registered MSO networks (so-called "partner networks"), and hence further expanding coverage areas that can provide uninterrupted Wi-Fi services. In still other cases, a cellular network provider may redirect a cellular subscriber (who is not a member of a MSO network) to use the MSO's Wi-Fi network so as to offload cellular network congestion; here, the cellular network provider may subsidize the Wi-Fi roaming costs. The cellular network may instruct the client device of the cellular subscriber to switch the IP traffic to use the Wi-Fi connection instead of the cellular data connection. Any data originally targeted for communication via the cellular network is delivered over the Wi-Fi network.

Detailed Description of Exemplary Embodiments

Exemplary embodiments of the apparatus and methods of the present disclosure are now described in detail. While these exemplary embodiments are described in the context of a wireless network connectivity provided by a multiple systems operator (MSO) that offers digital networking capability and Internet Protocol (IP) packet delivery capability, the general principles and advantages of the disclosure may be extended to other types of networks and architectures that are configured to deliver digital media data (e.g., text, video, and/or audio). Such other networks or architectures may be broadband, narrowband, wired or wireless, or otherwise, the following therefore being merely exemplary in nature.

Moreover, it will be appreciated that while described generally in the context of a network providing service to a vehicular context, the present disclosure may be readily adapted to other types of mobile, "limited mobile" (e.g., low-velocity or spatially constrained vehicles such as trams, elevators, moving walkways, etc.) and non-mobile environments including, e.g., commercial/enterprise, and government/military applications. Myriad other applications are possible, as will be recognized by those of ordinary skill given the present disclosure.

Also, while certain aspects are described primarily in the context of the well-known Internet Protocol (described in, inter alia, *Internet Protocol DARPA Internet Program Protocol Specification,* IETF RCF 791 (September 1981) and Deering, et al., *Internet Protocol, Version 6 (IPv6) Specification,* IETF RFC 2460 (December 1998) each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Service Provider Network—

FIG. 1 illustrates a typical service provider network configuration useful with the features of the exemplary wireless network described herein. This service provider network 100 is used in one embodiment of the disclosure to provide backbone and Internet access from the service provider's wireless access points (e.g., Wi-Fi APs). As described in greater detail hereinafter, in one exemplary embodiment, the Wi-Fi APs may be parent APs (PAPs), children APs (CAPs), and/or transit APs (TAPs).

As opposed to an unmanaged network, the managed service-provider network of FIG. 1 advantageously allows, inter alia, control and management of a given user's access via the Wi-Fi AP(s), including imposition and/or reconfiguration of various access "rules" or other configurations applied to the wireless access points, and a substantially centralized billing and "entitlements" paradigm (e.g., "content anywhere" for a subscriber once they have been authenticated). As but one example, the wireless access points (see discussion of FIG. 2 infra) disposed at the service location(s) can be coupled to the bearer managed network (FIG. 1) via e.g., a cable modem termination system (CMTS) and associated local DOCSIS modem, a wireless bearer medium (e.g., millimeter wave, or an 802.16 WiMAX system), a fiber-based system such as FiOS or similar, a third-party medium which the managed network operator has access to (which may include any of the foregoing), or yet other means.

Advantageously, the service provider network 100 also allows components at the service location (e.g., Wi-Fi APs and any supporting infrastructure such as routers, switches, MIMO or modulation coding scheme (MCS) or other physical layer (PHY) configurations, etc.) to be remotely reconfigured by the network MSO, based on e.g., prevailing operational conditions in the network, changes in user population and/or makeup of users at the service location, business models (e.g., to maximize profitability), etc.

The various components of the exemplary embodiment of the network 100 include (i) one or more data and application origination points 102; (ii) one or more content sources 103, (iii) one or more application distribution servers 104; (iv) one or more VOD servers 105, (v) customer premises equipment (CPE) 106, (vi) one or more routers 108, (vii) one or more wireless access point controllers 110, (viii) one or more parent APs (PAPs) 112, (ix) one or more children APs (CAPs) 114, and/or (x) one or more transit APs (TAPs) 116. The application server(s) 104, VOD servers 105, CPE(s) 106, and router(s) 108 are connected via a bearer (e.g., HFC) network 101. A simple architecture comprising one of each of the aforementioned components 102, 103, 104, 105, 106, 108, 110, 112, 114, and 116 is shown in FIG. 1 for simplicity, although it will be recognized that comparable architectures with multiple origination points, distribution servers, VOD servers, CPE devices, routers, controllers, and/or access points (APs) (as well as different network topologies) may be utilized consistent with the present disclosure. For example, the headend architecture of FIG. 1a (described in greater detail below), or others, may be used.

Figure 1A:
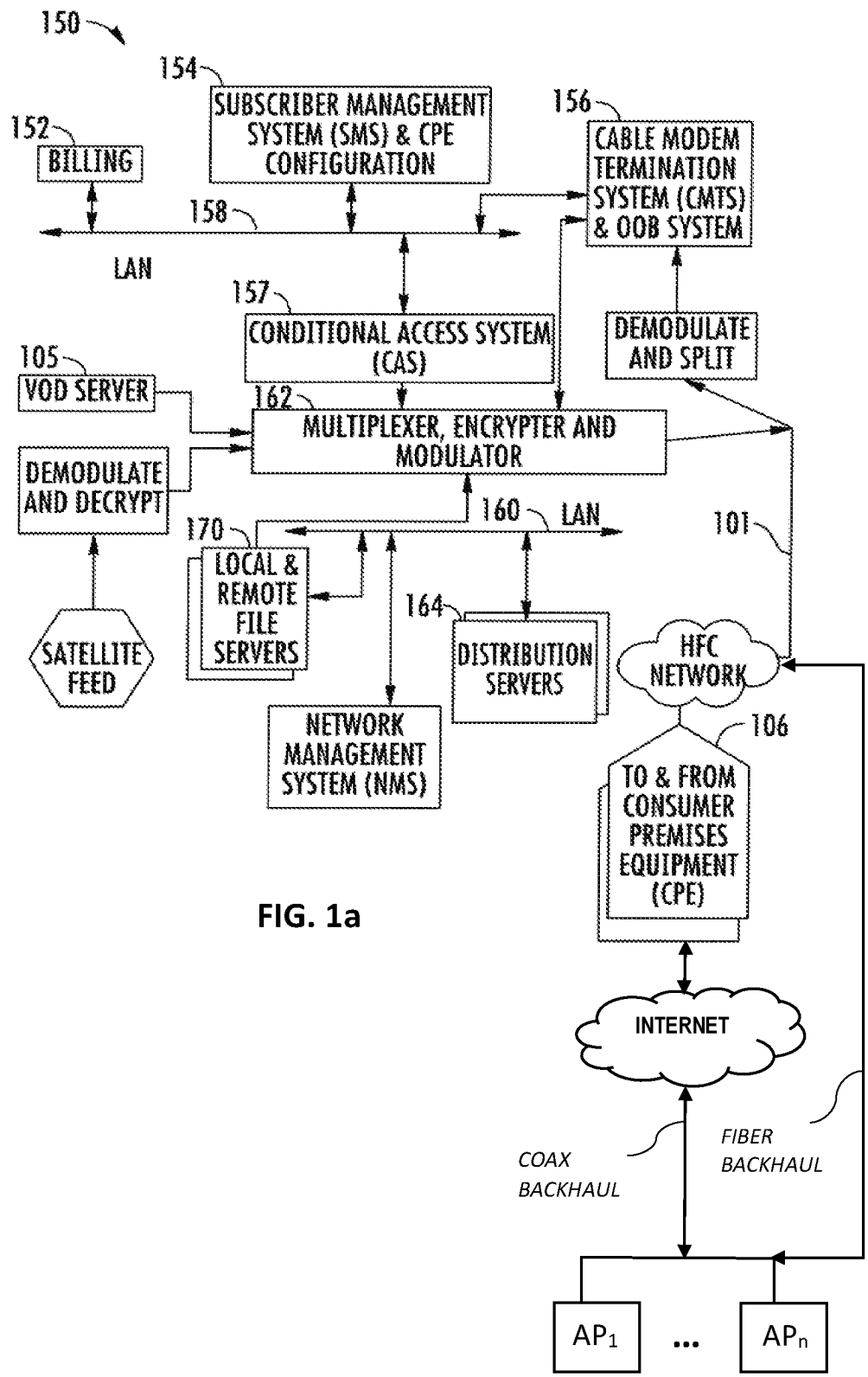
FIG. 1a is a functional block diagram illustrating one exemplary network headend configuration useful with various aspects of the present disclosure.

FIG. 1a shows one exemplary embodiment of a headend architecture. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN 158 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

Figure 1B:
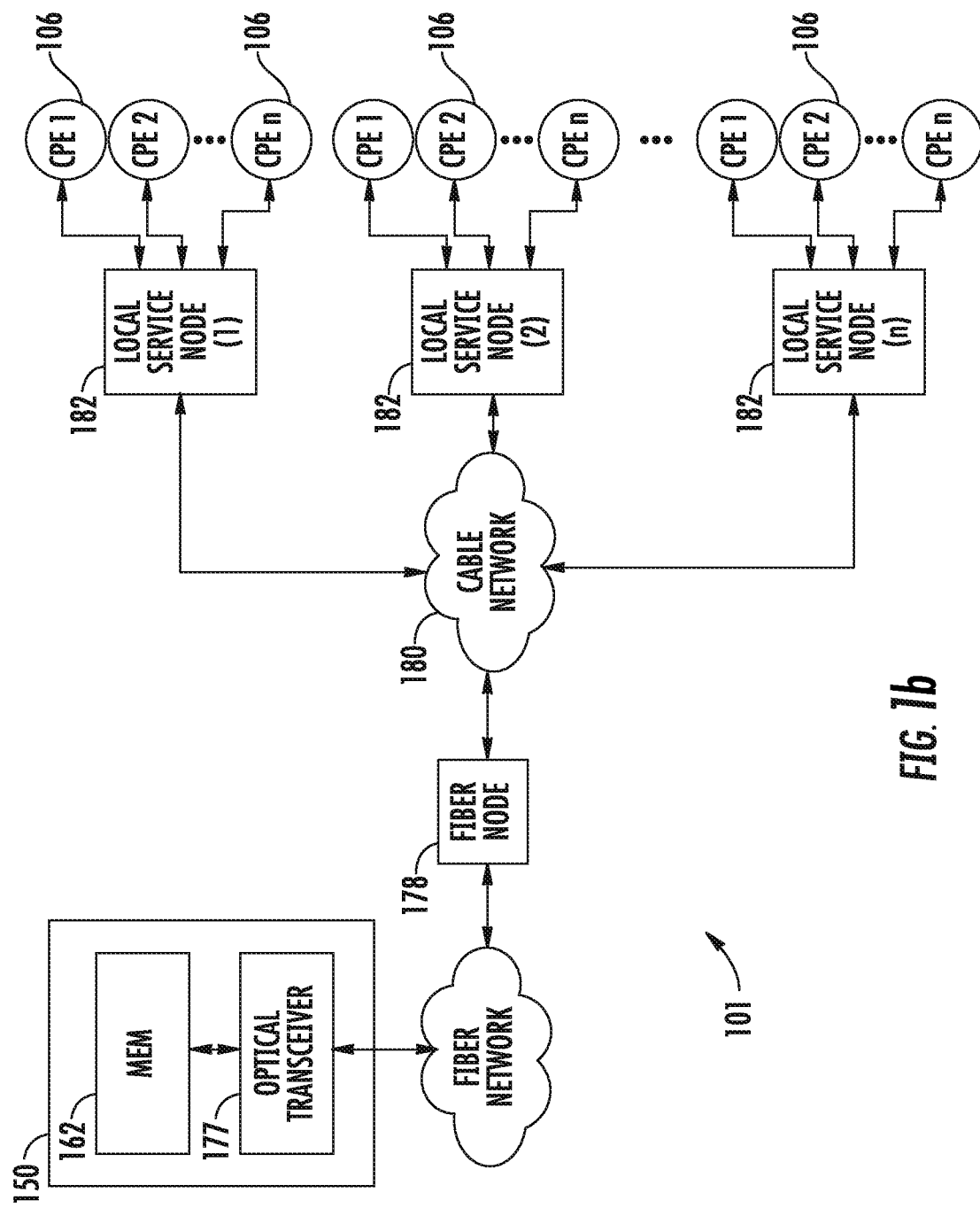
FIG. 1b is a functional block diagram illustrating one exemplary local service node configuration useful with various aspects of the present disclosure.

The exemplary architecture 150 of FIG. 1a further includes a conditional access system (CAS) 157 and a multiplexer-encrypter-modulator (MEM) 162 coupled to the HFC network 101 adapted to process or condition content for transmission over the network. The distribution servers 164 (which may include the application servers 104 of FIG. 1) are coupled to the LAN 160, which provides access to the MEM 162 and network 101 via one or more local and remote file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0, 3.1 (and subsequent) specification provides for exemplary networking protocols both downstream and upstream, although the present disclosure is in no way limited to these approaches.

Figure 1C:
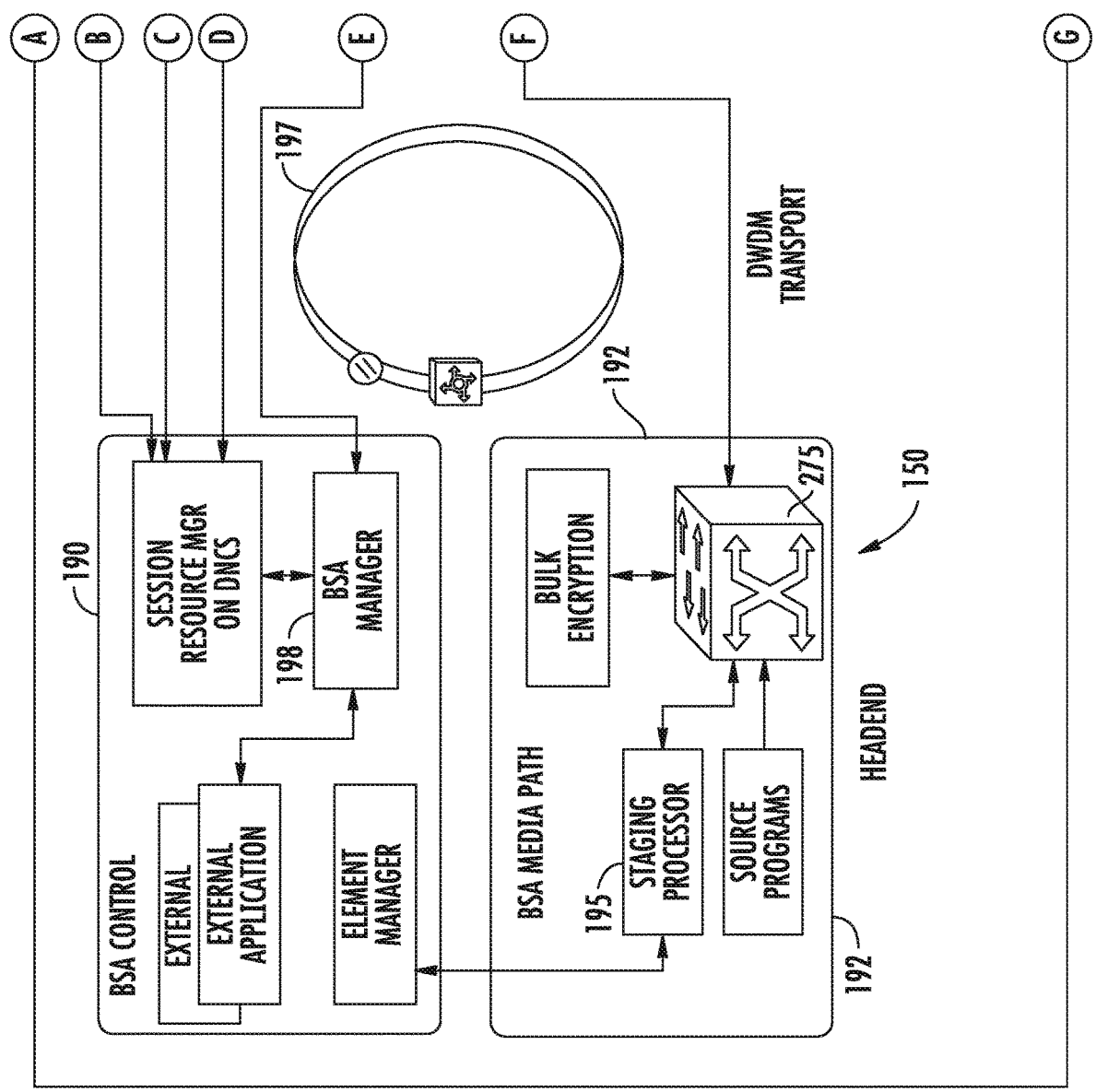
FIG. 1c is a functional block diagram illustrating one exemplary broadcast switched architecture (BSA) network useful with various aspects of the present disclosure.
Figure 1C:
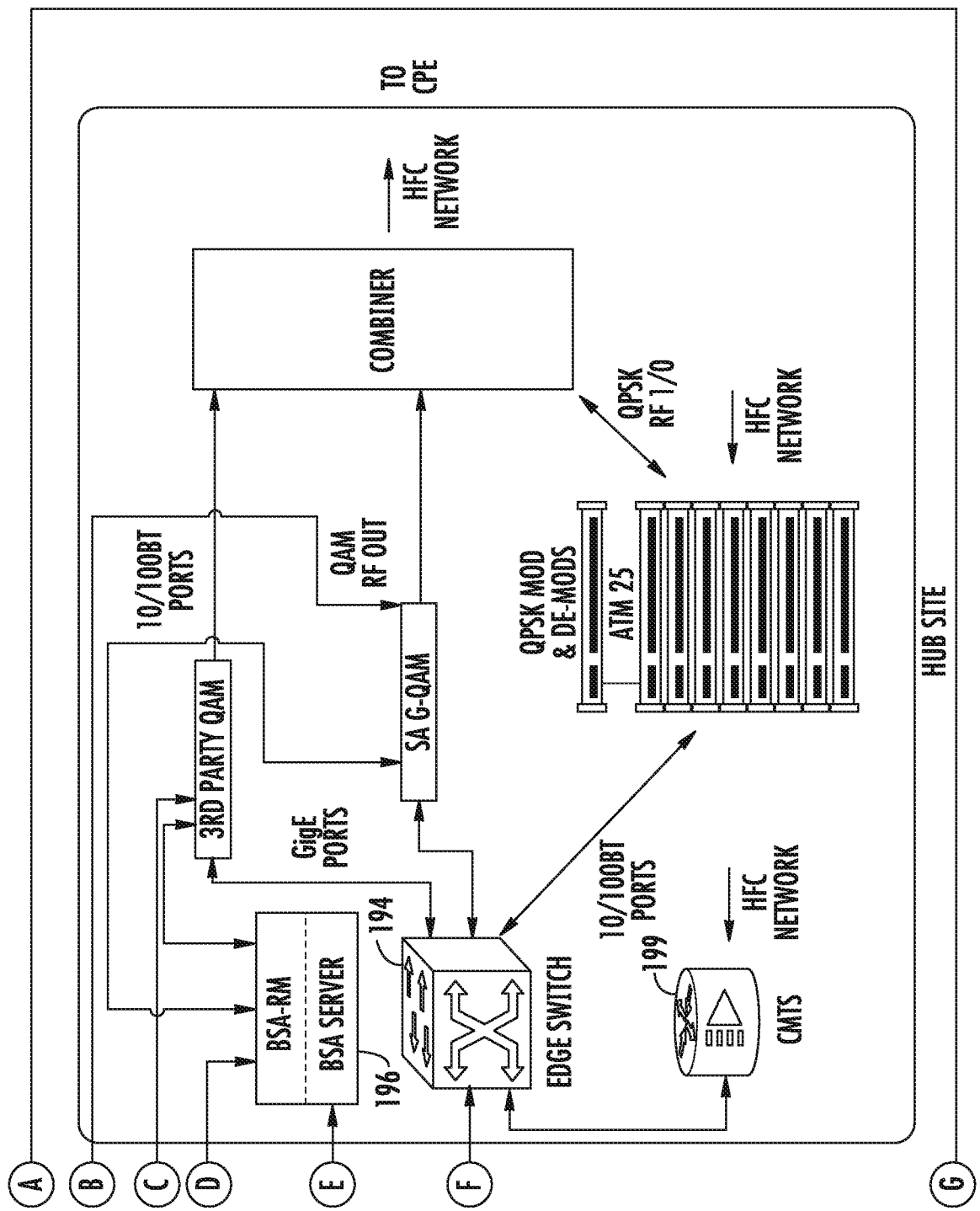

FIG. 1c illustrates an exemplary "switched" network architecture which may be used consistent with the present disclosure for, inter alia, provision of services to the wireless access points of interest. Specifically, the headend 150 contains broadcast switched architecture (BSA) control 190 and BSA media path 192; these elements cooperating to control and feed, respectively, downstream or edge switching devices 194 at the hub site which are used to selectively switch broadcast streams to various service groups. BSA media path 192 may include a staging processor 195, source programs, and bulk encryption in communication with a switch 275. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to e.g., the user's PC or other IP-enabled device via the user's cable modem and/or premises gateway. Delivery in such packetized modes may be unicast, multicast, or broadcast.

Referring again to FIG. 1c, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component.

The edge switch 194 forwards the packets received from the CMTS 199 to the QAM modulator 189, which transmits the packets on one or more physical (QAM-modulated RF) channels to the CPE. The IP packets are typically transmitted on RF channels (e.g., DOCSIS QAMs) that are different than the RF channels used for the broadcast video and audio programming, although this is not a requirement. The CPE 106 (shown in FIG. 1) are each configured to monitor the particular assigned RF channel (such as via a port or socket ID/address, or other such mechanism) for IP packets intended for the subscriber premises/address that they serve.

Figure 1D:
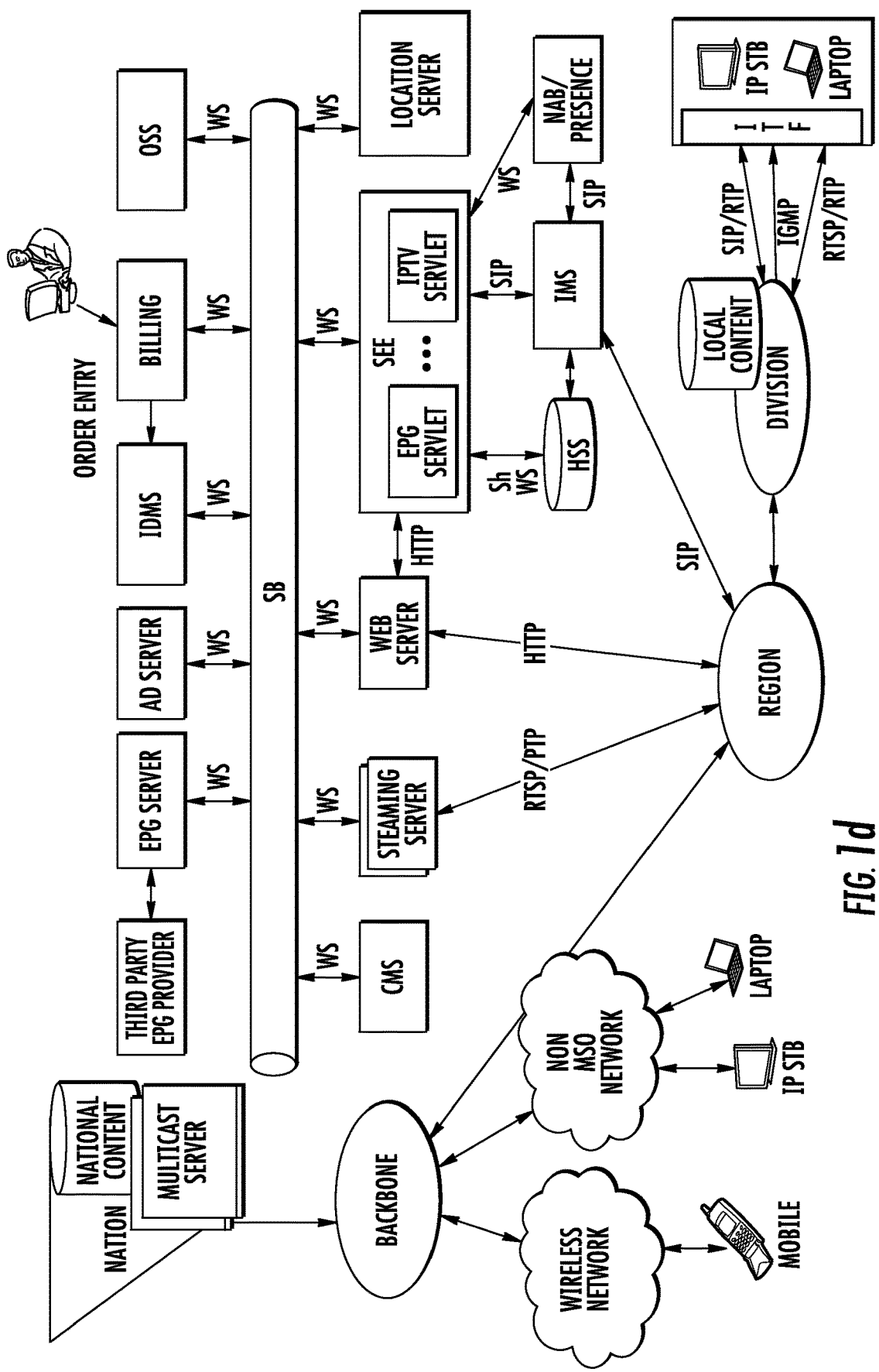
FIG. 1d is a functional block diagram illustrating one exemplary packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in co-pending U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title filed on Apr. 21, 2010, each of which is incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

It will be appreciated that the foregoing MSO or managed network can advantageously be leveraged for easy installation of the various AP components described herein (e.g., PAP/CAP/TAP) within a geographic region. Specifically, in that the MSO network is already pervasive through a given area (i.e., the MSO has numerous customers, both business and residential and otherwise) within a given area, the MSO already has significant infrastructure deployed, and often at a very high level of granularity. Hence, where a given AP needs to be placed at a given location in order to effect the coverage/operation for the Wi-Fi network described herein, the MSO can easily "tap off" that existing infrastructure in that area to enable the AP placement. This may take the form of e.g., placement of an AP coincident with a given customer's extant equipment, and/or placement of new equipment that taps off a local service node. The present disclosure further contemplates provision by the MSO (or other parties) of consideration to the customer for allowing the placement of the equipment on their premises (e.g., payments, credits on their bill, special services or features, etc.).

As noted elsewhere herein, it is also contemplated that the service provider may utilize or "piggy back" off the infrastructure of other service providers, utilities, etc. For instance, a third party service provider may have a high-bandwidth backhaul "drop" near a location desired by the MSO; the MSO can they lease, pay, rent, etc. that third party for use of the drop. Similarly, traffic signal poles, lighting, bridges, tunnels, etc. all contain a wide variety of cabling, conduits, and other infrastructure which the (host) MSO could make use of so as to obviate having to perform a new installation (and all of the attendant costs and delays thereof).

Exemplary Wireless Network Architecture and Methods—

Figure 2:
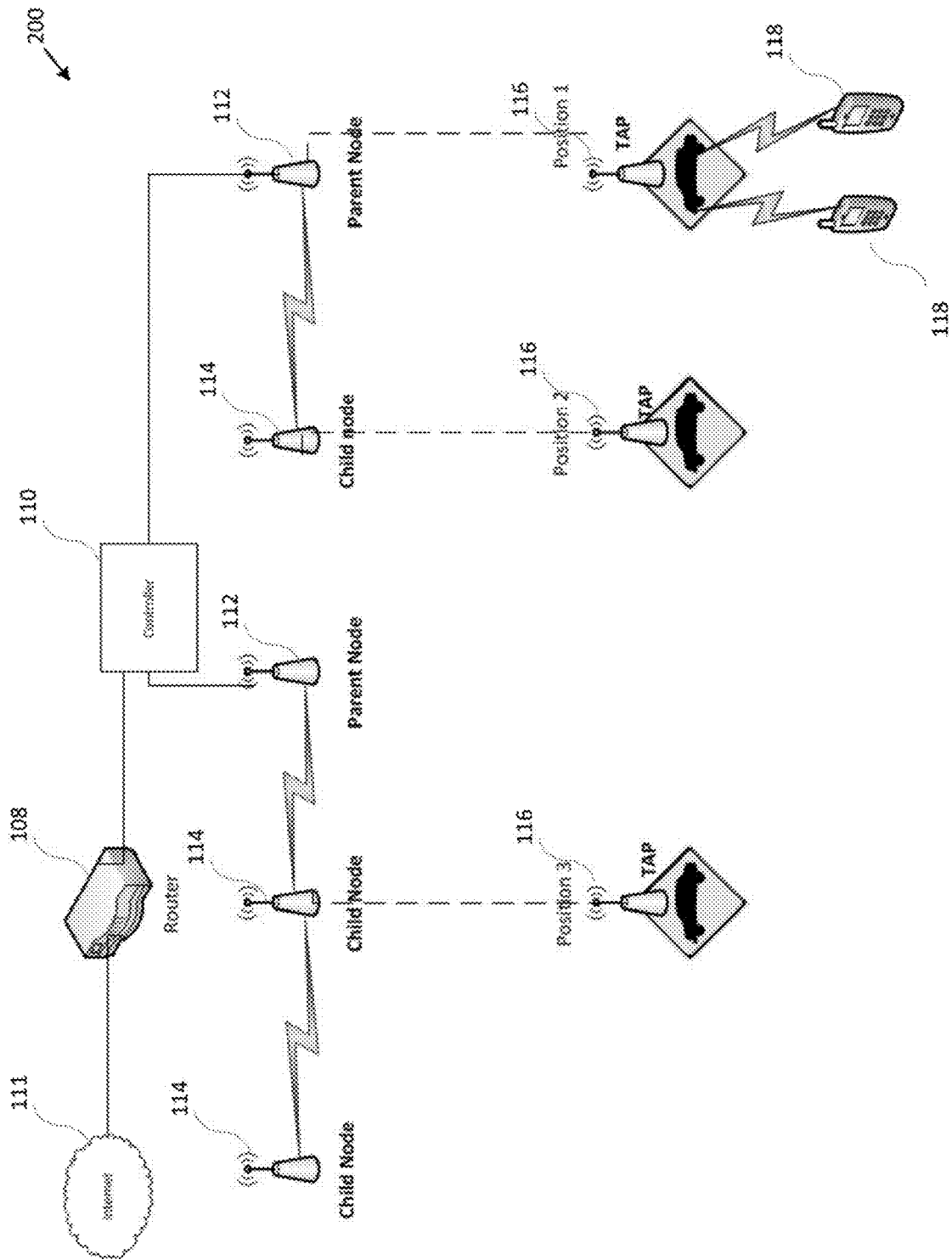
FIG. 2 is a functional block diagram illustrating one exemplary wireless network configured to provide wireless network coverage within vehicles, useful with various aspects of the present disclosure.

Referring now to FIG. 2, one exemplary wireless network 200 configured to provide wireless network coverage within e.g., vehicles, according to the various principles is described herein. In one embodiment, the wireless network 200 of FIG. 2 is coupled to the MSO network via e.g., the Internet 111 by a router 108 (as described supra). As previously alluded to, an exemplary access point (AP) controller 110 that operates as a service node for a number of parent access points (PAPs) 112. Each of the PAPs 112 is configured to provide backhaul access via a wireless coverage area to children access points (CAPs) 114 and/or transit access points (TAPs) 116. Each of the CAPs 114 is configured to augment the wireless coverage area of a PAP 112 by relaying wireless signals from a TAP 116 to the PAP 112, and vice versa. In the exemplary embodiment, each TAP is configured to service one or more client devices 118 within a vehicle. Unlike prior art Wi-Fi networks of APs (which directly connects wireless clients via an AP to a backhaul network), various embodiments of the present disclosure enable "daisy-chaining" of a number of intermediary hotspots to provide backhaul connectivity to clients.

As used herein, the term "access point" includes, but is not limited to, any wireless device operating that enables one or more other devices (which themselves may be an access point and/or a client device) to connect to a wired or wireless network using Wi-Fi, or a similar wireless networking standard. It is appreciated that while Wi-Fi (and its several variants) is the prevalent, de facto standard for wireless local area networking, the various aspects of the present disclosure are in no way limited to Wi-Fi, and in fact further contemplate heterogeneous implementations, such as where Wi-Fi and another air interface standard are employed in concert, such as to provide heterogeneous capabilities in terms of range, bandwidth, frequency band of operation, etc. As noted above, Wi-Fi in its current incarnation has ranges on the order of 100 feet or so, and data bandwidth on the order of 200 Mbps (DL). It may be the case that in certain geographic areas, an AP with less bandwidth and greater range may suffice or be desirable (due to e.g., topological considerations, propagation challenges, less demanding use-cases, etc.), and hence the present disclosure allows for such "intelligent mixing" of different air interfaces to achieve a more optimized result.

An access point may further include additional capabilities, including but not limited to: network management, security capabilities (authorization, authentication, etc.), routing capabilities, firewall capabilities, network address translation (NAT), encapsulation, virtual private network (VPN), etc.

As used herein, the term "client device" refers generally to any electronics device configured to transmit and receive data for application and/or use; client devices may include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smart watches, and smartphones. A client may also be wholly or partly integrated with a vehicular telematics or infotainment system, or even constitute an aggregation of two or more individual clients (e.g., two or more devices logically cooperating with one another to provide a desired capability or functionality).

As used herein, the term "vehicle" refers generally and without limitation to any mobile machine used to transport persons and/or cargo, and may include, but are not limited to: cars, buses, trains, planes, boats, trams, elevators, submersibles, etc.

In one exemplary embodiment, the TAP 116 is located at a static (or semi-static) position relative to the vehicle. Radio link fading is primarily due to distance, weather conditions, and visibility; thus, the radio channel conditions between the TAP 116 and the client device 118 are relatively stable and unchanging when considered relative to the radio conditions between the TAP 116 and the PAP 112 or CAP 114.

As a brief aside, in the exemplary context of Wi-Fi operation, APs and client devices share the same resources. For example, the uplink and downlink must arbitrate over the same bandwidth according to e.g., time slots. Thus, increasing the uplink transactions decreases downlink resources available for transactions (and vice versa). From a network resource utilization and/or interference standpoint, operating a TAP hotspot for a client device provides multiple benefits when compared to directly connecting a client to a PAP/CAP hotspot. Firstly, most client devices are portable handheld devices (e.g., smartphones and laptops) which have limited battery capabilities; consequently, client devices are often unable to maximally utilize reception and transmission techniques that consume more power (e.g., multiple input multiple output (MIMO), increasing transmit and reception gain, increasing processing gains, etc.).

In contrast, vehicles have ready access to power (e.g., an electrical system driven by the engine, etc.); thus vehicles can provide power to a TAP to enable more aggressive radio techniques, while simultaneously addressing client device power consumption.

Performance improvements may be further amplified where there are multiple client devices within a vehicle. For example, even though each client device is unaware of the service requirements of the other client devices in the vehicle, a TAP services all of the client devices and is able to centrally manage services for the vehicle. In some scenarios, a TAP can prioritize services for the community of client devices, and service client devices concurrently by ensuring that each client device is granted an appropriate amount of bandwidth according to an allocation scheme. Common allocation schemes include e.g., fairness, prioritization, round-robin, etc. Centrally managed allocation schemes can prevent or reduce close quarters client device interferences (i.e., where multiple client devices interfere with each other, resulting in sub-optimal performance for the devices).

Additionally, a TAP can consolidate network management overhead; for example, a single TAP can change its backhaul access link path between the various PAPs and CAPs of the wireless mesh network transparently to each of its serviced client devices. This greatly simplifies the processing burden on each of the client devices; additionally, it reduces overall network strain as the wireless mesh network can handle one aggregated handover for all the connected client devices of the TAP, rather than negotiating each handover individually. As a brief aside, so-called "mesh networks" enable each node to relay messages to other nodes of the network; relaying may occur via any number of intermediary nodes (i.e., "hops"). Existing mesh networking technologies encompass fully connected meshes (i.e., where each node is connected to all other nodes) as well as partially-connected meshes (i.e., where nodes are connected to some subset of the total network). Mesh networks may employ both routing addressing (i.e., unicast) and so-called "flooding" address schemes (i.e., broadcast/multicast).

As used herein, the term "handover" refers to a transfer of a device (access point or client) from one serving access point to another serving access point. Handovers may be intra-network (i.e., within the same network) or inter-network (i.e., between two different networks).

During data transactions, the intermediary access points of the wireless mesh network (e.g., the PAP 112 and/or intermediary CAPs 114) connect to a backhaul link for the TAP 116 and its respective client devices. Functionally, each intermediary access point can aggregate, and transfer bi-directional data from one or more downstream (or "southbound") peers as well as its upstream (or "northbound") service node to provide the requisite backhaul link. More directly, it should be appreciated that each CAP may be required to support multiple TAPs, and each PAP may support multiple CAPs and TAPs. Since the overall bandwidth that is serviceable by the PAP may be limited by the PAP's Wi-Fi bandwidth, each intermediary node may be required to manage congestion either by prioritizing delivery of data (including potentially dropping data), and/or throttling data rates appropriately.

In one embodiment, the upstream and downstream connectivity is performed according to a Time Division Multiple Access (TDMA) scheme. Other appropriate multiple access schemes may be used, including for example Frequency Division Multiple Access (FDMA), Orthogonal Frequency Division Multiple Access (OFDMA), Code Division Multiple Access (CDMA), etc. Certain system design considerations may require the flexibility of packet-switched delivery, or alternately, the bandwidth guarantees of circuit-switched delivery. Additionally, network content delivery may further include capabilities and support for Quality-of-Service (QoS) parameters. QoS parameters support resource reservation control mechanisms and may, inter alia, provide different priorities to different content data, or guarantee a minimum delivery rate.

From a cost perspective, operating a network of hotspots for backhaul access capabilities is far superior to the alternatives. At current (2016) prices, a cellular tower that provides coverage over distances of 1500 feet (about 7 million square feet if assumed omni-directional) costs approximately $1.5M, and may have maintenance costs of $200K per year. Satellite deployments are even more expensive, and require near-earth rocketry (typically requiring government licensing and contracts, etc.). In contrast, a Wi-Fi hotspot can provide coverage over distances of 250-300 feet (280 thousand square feet), and each hotspot costs approximately $1.5K with maintenance costs of $3K per year. Wi-Fi enabled integrated circuit (IC) prices are sub-$1 at the time of this writing. Thus, an array of Wi-Fi hotspots that provide equivalent coverage areas to a cellular tower would be approximately $38K. Additionally, while cellular towers provide coverage over a broad area, the smaller coverage area of Wi-Fi hotspots enables focused or tailored deployments. For example, a linear distance of 1500 feet (such as would be suitable for a roadway) could be covered with as few as 6 hotspots.

Various other improvements and optimizations attributable to aggregating client devices within a vehicular hotspot will be readily appreciated by those of ordinary skill in the related arts, given the contents of the present disclosure.

Backhaul Link Management—

Traditionally, within the context of Wi-Fi networking, the connection quality is primarily limited by the radio link between the client and its serving AP. Thus, where the client device has poor reception, the client device adjust its operation to compensate (e.g., by reducing application software performance, etc.). However, unlike traditional wireless networking, the exemplary wireless network of access points described herein is not primarily bottlenecked at the client; rather the weakest radio link is most likely to occur between two or more of the TAP, CAPs, and/or PAP. For example, the TAP may experience significant mobility-related issues that affect channel quality to the CAP. Similarly, even where a TAP has a relatively clear connection to a CAP, the CAP's link to the PAP may experience attenuation due to e.g., rain fade, distance, momentary obstruction, etc. Since the bottlenecking radio link of the wireless "mesh fabric" is not apparent to the endpoints (i.e., the client device 118 and the network entity), various features and embodiments of the present disclosure are directed to managing backhaul link operation.

Figure 3:
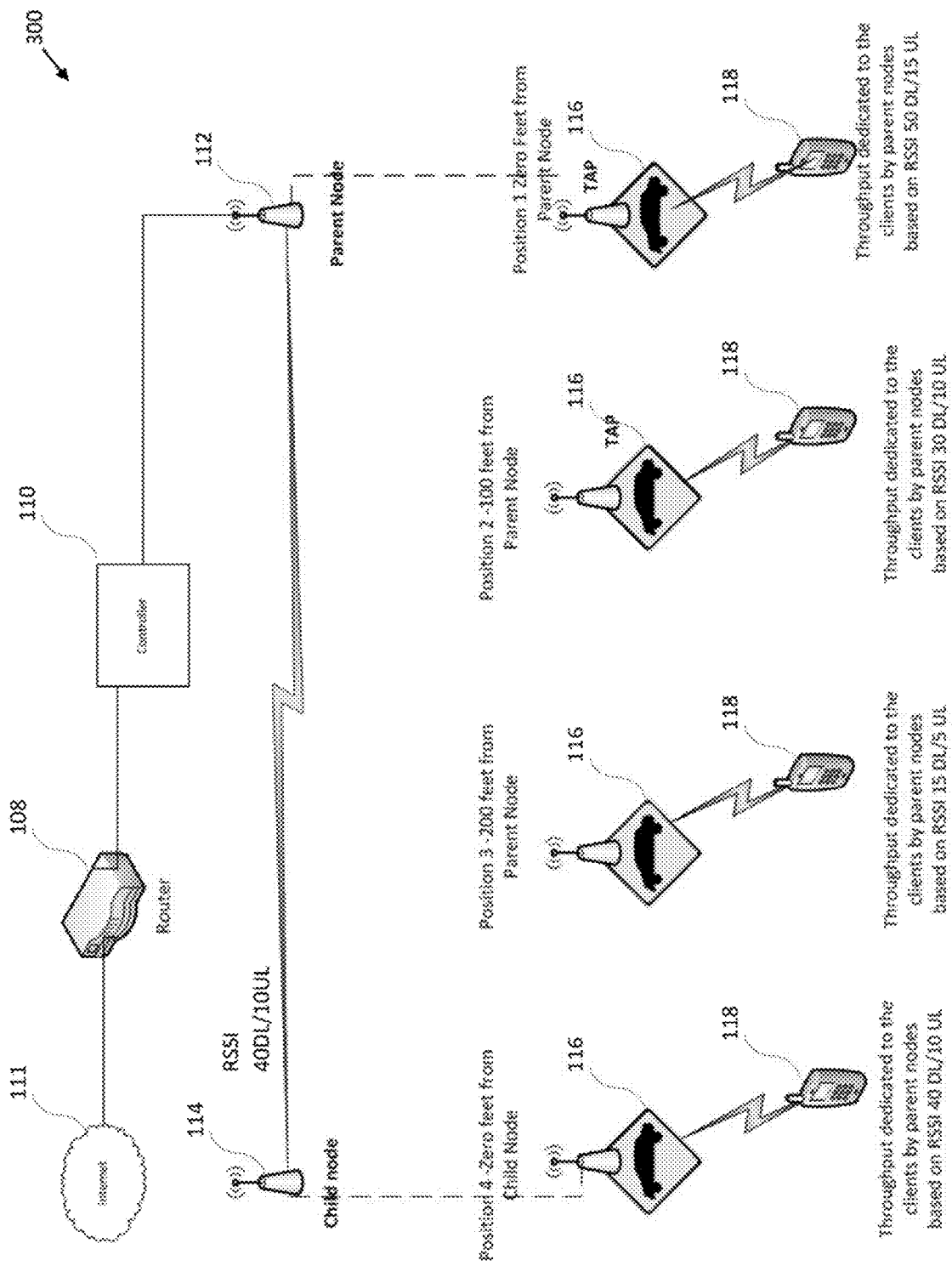
FIG. 3 is a functional block diagram useful for illustrating the effects on data throughput as one exemplary access point moves while connected to a mesh network, in accordance with various aspects of the present disclosure.

FIG. 3 illustrates the effect on data throughput as one exemplary TAP 116 moves while connected to a mesh network of a PAP 112 and CAP 114. As the TAP moves farther away from the PAP, its radio link weakens until the TAP nears a CAP; thereupon the TAP can perform a "handover" to establish an optimal (or more optimal) replacement link.

As shown, the TAP moves from a first position (~0 ft from PAP) to a second position (~100 ft from the PAP, ~200 ft from the CAP) and throttles data rates to/from its clients commensurate to its diminishing reception quality. While the TAP is in the first position, it can offer a total throughput based on its received signal strength (RSSI); e.g., the TAP can provide a downlink (DL) data rate that corresponds to an RSSI of 50, and an uplink (UL) data rate that corresponds to an RSSI of 15. As the TAP nears the second position, its downlink and uplink rates have diminished (corresponding to RSSIs of 30 DL and 10 UL, respectively).

As the TAP leaves the second position and moves to the third position (~200 ft from the PAP 112, ~100 ft from the CAP) performance at the TAP continues to degrade. Artisans of ordinary skill in the related arts, given the contents of the present disclosure, will readily appreciate that Wi-Fi APs contend over the same transmit and receive resources (e.g., timeslots); e.g., TAP bandwidth detracts from the bandwidth available to the CAP, and vice versa. Thus, even though the channel between the TAP and CAP is relatively clear, the TAP may still have a better overall performance by remaining connected to the PAP rather than handing over to the CAP.

Unfortunately, the TAP and CAP nodes may be unaware of the overall network topology and bandwidth capabilities. Although the PAP has an overarching network view, the PAP does not have direct access to point-to-point link quality information (e.g., RSSI, etc.) Accordingly, in one embodiment, each "parent" node determines the overall bandwidth allocations for each of its immediate downstream "children" nodes, thereby localizing link decisions to the node that is most closely situated to the radio links. More directly, the PAP controls the resource allocations for its immediately connected downstream CAP(s) and TAP(s) (if any); similarly, the CAP controls resource allocations for any of its immediately connected downstream CAP(s) and TAP(s) (if any), etc.

As shown, once the TAP leaves the third position and moves to the fourth position (~0 ft from the CAP), the TAP's connection to the PAP is too far attenuated. Thus, in order to maximize its throughput, the TAP may continuously search for, and handover to, an optimal CAP (or another PAP). The TAP may consider a variety of considerations in determining the optimal CAP or PAP. Common considerations include e.g., channel quality, network congestion, cost considerations, roaming network agreements, user preference, historic performance, etc. Once the TAP has identified the CAP and successfully performed a handover, the TAP's throughput is restored.

Inter-Network Handovers—

Artisans of ordinary skill in the related arts will readily appreciate that existing Wi-Fi technology was designed for wired backhaul access; thus, hotspots are not configured to dynamically change backhaul access. As a brief aside, existing Wi-Fi networks might group together a number of APs with overlapping coverage with a single common service set identifier (SSID). Typically, existing large scale hotspot deployments only use a few SSIDs; for example, a corporate campus may use one SSID for a private network and another SSID for a public network. Once a client device has registered with a network, it will ignore wireless packets from other networks with a different SSID.

Unlike prior art Wi-Fi technologies, various embodiments of the present disclosure are directed to an access point with a wireless backhaul link. For example, consider FIG. 4 which illustrates a TAP 116 that moves from a first network 400 with a first SSID to a second network 404 with a second SSID. As shown, the TAP 116 starts with a connection to PAP 114B, and moves out of its service area into the coverage of CAP 114A and/or PAP 112A. The TAP 116 connects to the CAP 114A or the PAP 112A based on the RSSI link from the TAP 116 to either the CAP 114A or the PAP 112A. In simple embodiments, the TAP may simply terminate all existing sessions and adopt the SSID of its new network; thereby requiring its wireless clients to re-connect under the new SSID. While such an implementation would ensure compatibility with existing Wi-Fi operation, the abrupt termination of service and/or network congestion caused by all wireless clients attempting to re-connect would result in undesirable performance impacts.

Figure 4:
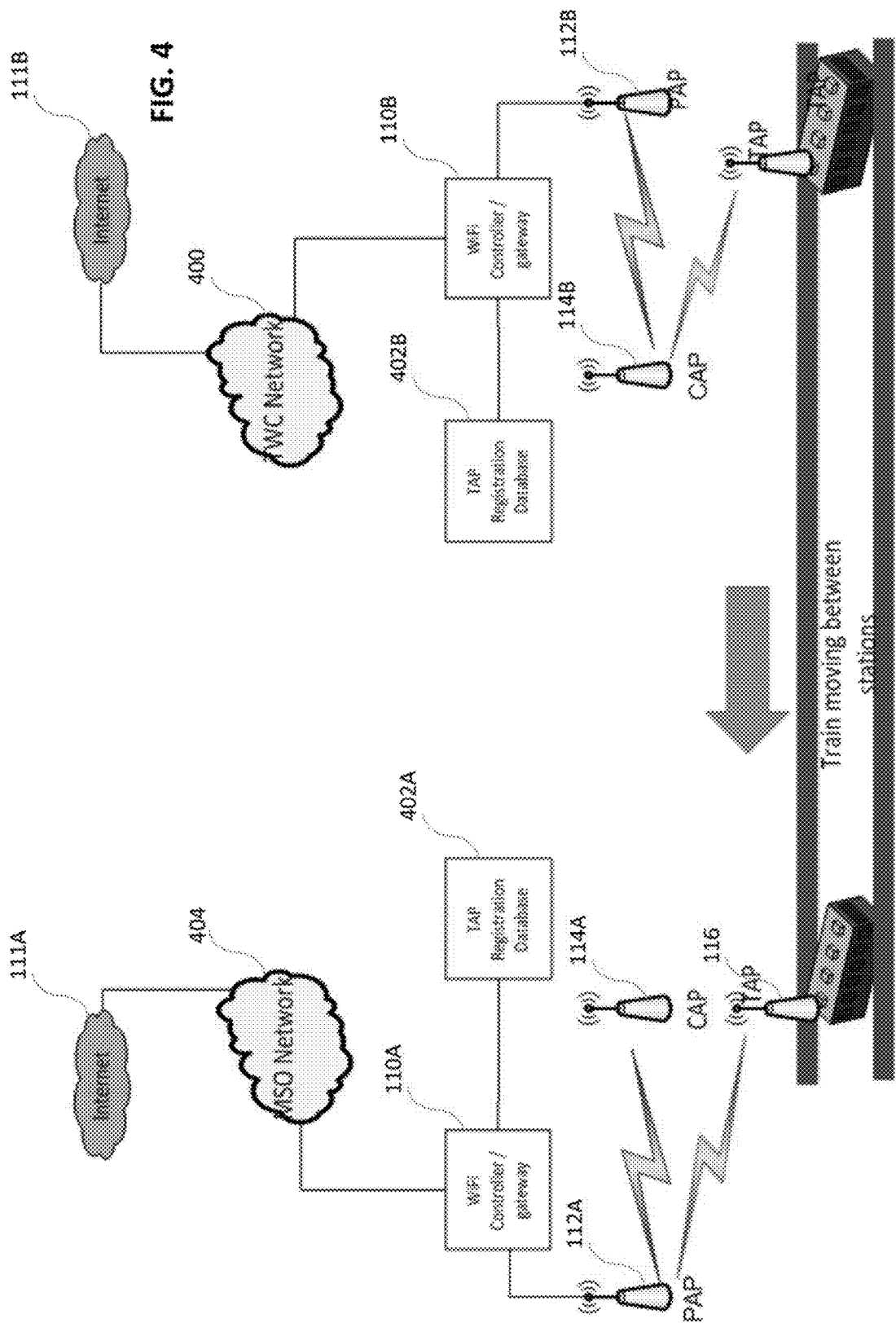
FIG. 4 is a functional block diagram useful for illustrating network registration for one exemplary access point while connected to mesh networks, in accordance with various aspects of the present disclosure.

Rather than abruptly terminating existing sessions, in one optimized variant, the TAP 116 maintains a presence in multiple networks simultaneously. As illustrated in FIG. 4, each network maintains a separate TAP registration database (402A, 402B) which includes recognized TAPs. Additionally, each TAP maintains its own proxy SSID, that is persistent regardless of the SSID of its underlying backhaul access. In this manner the TAP's SSID is not changed when the TAP moves from one network to another, thereby allowing seamless operation for its wireless clients.

Methods—

Figure 5:
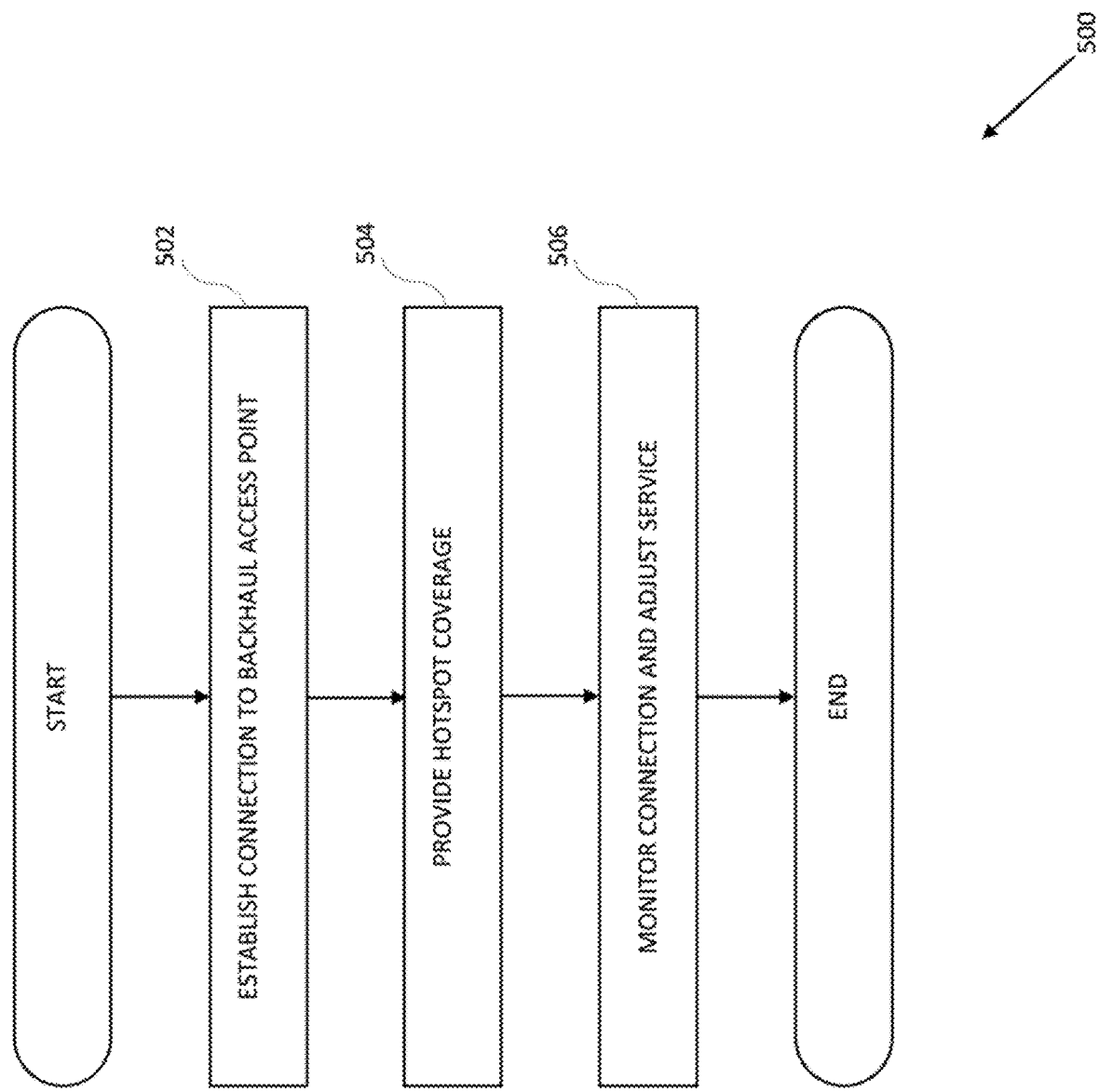
FIG. 5 is a logical flow diagram of one embodiment of a generalized method for aggregating traffic for operation with a wireless backhaul access network, useful with various aspects of the present disclosure.

FIG. 5 illustrates one embodiment of a generalized method 500 for aggregating traffic for operation with a wireless backhaul access network.

At step 502 of the method 500, an access point (e.g., TAP) establishes a connection with one or more backhaul access points (e.g., CAP/PAP). In one embodiment, the access point discovers the presence of backhaul access points based on one or more beacon signals via e.g., active searches, user input, etc. Once the access point has discovered one or more available backhaul access points, the access point may preferentially connect to a backhaul access point based at least in part on information included within the one or more beacon signals. Common examples of such information may include e.g., network identification, signal quality, supported modes of operation, network congestion, etc. In some embodiments, the access point may connect to multiple backhaul access points in tandem so as to e.g., ensure the presence of at least one connection, access multiple different networks simultaneously, etc.

In one variant, the access point is configured to connect to a particular backhaul access point (CAP/PAP) based at least in one or more predefined parameters. In some cases, the predefined parameters may be set by the network provider; in other cases the predefined parameters may be set by the user (e.g., based on user preferences for billing, power consumption, etc.). In still other cases, the predetermined parameters may be internally managed by the access point based on ongoing device considerations (e.g., processing burden, power management considerations, hardware/software compatibility, etc.).

In other cases, the access point may also be steered or associated with a backhaul access point based on e.g., different services provided by that upstream backhaul access point (e.g., higher available upstream bandwidth); see, e.g., the methods and apparatus described in co-owned and co-pending U.S. patent application Ser. No. 14/959,885 filed on Dec. 4, 2015 and entitled "APPARATUS AND METHODS FOR SELECTIVE DATA NETWORK ACCESS", previously incorporated herein, for exemplary approaches to such association.

In one embodiment, the access point may operate within the coverage area of multiple networks. For example, in one variant, the access point may receive multiple signals from multiple different backhaul access points with different Service Set Identifiers (SSIDs). The access point may connect via one or more of these different backhaul access points, ostensibly providing a coverage area that bridges between the different backhaul networks. In such variants, the access point may select which backhaul access points to connect, based on one or more of a multitude of considerations including, without limitation: (i) the access point's processing burden, (ii) the access point's transceiver capabilities, (iii) the access point's power consumption/remaining power, (iv) the link quality of each backhaul access point, (v) the congestion of each backhaul access point, and/or (vi) overarching network coverage considerations (e.g., based on data generated from a centralized access point or access point controller).

In one such implementation, each backhaul network maintains an access point registry that enables registered access points to migrate into and out of the backhaul network with minimal handover overhead (e.g., authentication, authorization, etc.). In some variants, the access point registry may periodically "prune" access points based on e.g., inactivity, last use, first use, frequency of use, and/or network considerations, etc. In some cases, an access point may be added to the access point registry upon a successful registry within the network.

In other cases, an access point may be added to the access point registry pre-emptively based on e.g., forecasted activity, out-of-band "pushes" (described in greater detail infra), etc. In still other cases, an access point may be added to the access point registry based on a threshold condition (e.g., a number of uses within a designated time period, etc.).

Each access point is, in the exemplary configuration, identified by a unique identifier to the access point controller and/or access point registry. Common examples of unique identifiers include, without limitation, a user email account (or other subscriber-specific account), vehicular identification (e.g., VIN number, license plate, etc.), account number, device-specific identifier (e.g., medium access control (MAC) ID, serial number etc.), software registration number (e.g., assigned during initial software installation), etc.

In one embodiment, registration with a backhaul access point network includes establishing a permanent or semi-permanent security association between the backhaul access point network and the access point. In some implementations, the access point is authenticated and/or authorized to service client devices using a network identifier. For example, the access point may be assigned a service set identifier (SSID). In some embodiments, the network identifier matches the backhaul access network's identifier; alternatively, the network identifier may be unique to the access point, and maintained when the access point connects to a different backhaul network.

As a brief aside, within the context of Wi-Fi, client devices ignore packets that have different SSIDs. Thus, session continuity can only be maintained in a Wi-Fi handover where the SSIDs are the same between two access points of the same Wi-Fi network. However, artisans of ordinary skill in the related arts will readily appreciate that the various principles described herein may be used with equivalent success in technologies that support session continuity for cross-network data transfers, and/or that provide for other handover provisions, the foregoing being purely illustrative. For example, the access point may support session continuity despite changing SSIDs in networks that support session continuity via out-of-band messaging, etc.

In some embodiments, after performing a boot-up procedure and upon registering with a backhaul access point, the access point receives configuration information from the backhaul access point, configures itself according to the configuration information, and holds the configuration until the next power recycle. Some examples of configuration include configuration settings for managing handovers between access points, managing throughput to connected devices, managing capabilities supported by the wireless network, etc. Holding the configuration until the next power cycle may allow the AP to seamlessly move between backhaul access points and provide uninterrupted Wi-Fi services.

At step 504 of the method 500 of FIG. 5, the access point provides its own hotspot coverage for one or more devices. In one exemplary embodiment, successful connection with a backhaul access point network provides the access point with information necessary to operate consistent with its backhaul access point network. For example, in the context of Wi-Fi, the access point receives a variety of network parameters including, without limitation: network identification (e.g., service set identifier (SSID)), beacon intervals, time stamps, supported features (e.g., data rates) and other parameters, traffic indications, etc.

It will be appreciated that the hotspot may be configured to support client devices and/or access points. For example, in one such use case, the hotspot is a vehicular access point that services a number of client devices of the vehicle (as well as e.g., the indigenous telematics functions). In other use cases, the hotspot is a child access point that services one or more vehicular access points. Still other variants may be a combination or hybrid of the foregoing.

In some cases, the access point may dynamically arbitrate for hotspot resources. For example, within the context of Wi-Fi, an access point may use existing Wi-Fi distributed coordination function (DCF) operation to share the wireless medium between multiple other access points and clients. DCF relies on carrier sense multiple access with collision avoidance (CSMA/CA), and optionally includes request to send/clear to send signaling (RTS/CTS) to share the wireless medium. In other schemes, the access point may assign specific resources for use (e.g., uplink and downlink frequencies, time slots, spreading codes, etc.) Generally, within the context of Wi-Fi, the beacon signal is transmitted within a dedicated time slot, whereas other data transmissions are dynamically arbitrated according to the aforementioned Wi-Fi DCF functionality.

As a brief aside, artisans of ordinary skill in the related arts will readily appreciate that increasing the uplink transactions decreases downlink resources available for transactions (and vice versa). Since data transactions and backhaul overhead use the same resources, it may be better from a network resource utilization and/or interference standpoint for the access point to relay data via an intermediary access point to a farther upstream access point, or to transmit the data directly to the upstream access point. Additionally, certain system design considerations may require the flexibility of packet-switched delivery, or alternately, the bandwidth guarantees of circuit-switched delivery. Network content delivery may further include capabilities and support for Quality-of-Service (QoS) parameters. QoS parameters support resource reservation control mechanisms and may, inter alia, provide different priorities to different content data, or guarantee a minimum delivery rate.

In view of the foregoing, in one embodiment, the access point may consider its own limitations, the requested service of its attached wireless clients, and/or network considerations in the selection of an optimal backhaul access link to service its traffic. In other embodiments, one or more intermediary nodes of the backhaul network may be required to manage traffic flow. Common traffic flow management tasks include e.g., reducing data rates and/or preferentially service one or more downstream devices. In still other embodiments, traffic management may be implemented at upstream network entities (such as the access point controller).

In some embodiments, the access point broadcasts one or more beacons that enable devices within its vicinity to discover the access point. As previously noted, wireless devices monitor for beacons, and regularly assess beacon signal strength in order to determine which access point can provide the best coverage. In other embodiments, the access point broadcasts one or more continuous signals (e.g., a pilot signal), so as to enable continuous mobility correction (e.g., fast fading compensation, etc.) In some variants, the continuous signals may be broadcast via a different bandwidth; for example, an access point may provide hotspot coverage via a 5 GHz bandwidth (consistent with existing Wi-Fi operation), and provide a dedicated pilot signal via a 2.4 GHz bandwidth. Still other solutions for mobility management will be readily appreciated by those of ordinary skill given the contents of the present disclosure.

Unlike existing wireless network service nodes, one embodiment of an access point continues to monitor its backhaul access link (step 506 of the method 500) and adjusts its service provisioning in accordance with its backhaul access link quality. In one such embodiment, the access point monitors its own movement so as to better predict future link quality, etc.

The backhaul access link quality is measured, in one implementation, based on received signal strength indication (RSSI). Artisans of ordinary skill in the related arts will appreciate that virtually any signal or link quality measure (or multiple measures used in tandem or in a coincidence/confirmatory fashion) may be substituted with equivalent success. Other examples of link quality include, without limitation: received signal strength (RSS), signal-to-noise ratio (SNR), carrier-to-noise ratio (CNR), signal-to-interference plus noise ratio (SINR), carrier-to-interference plus noise ratio (CINR), bit error rate (BER), block error rate (BLER), packet error rate (PER), etc.

In some embodiments, backhaul access link quality is measured on a periodic basis, such as e.g., at regular prescribed intervals, and/or at dynamically prescribed intervals (e.g., where the interval is dynamically shortened or elongated based on prevailing conditions such as vehicle movement speed/acceleration/deceleration which could make it more desirable to measure/sample at a different periodicity). In other embodiments, backhaul access link quality is measured continuously, or semi-continuously (e.g., continuously for prescribed durations, punctuated by periods of non-measurement). Still other embodiments may implement a combination of the foregoing; for example, an access point may continuously check its backhaul link while moving, but revert to periodic beacon measurements while stopped.

In one embodiment, when a better backhaul access link is available (as determined by e.g., one or more prescribed metrics or criteria), the access point initiates a handover to the better link. In one such variant, the access point may be instructed to connect to a particular backhaul access point by one or more higher-level network management entities (e.g., a network algorithm or process running on a network server or the like). In one exemplary embodiment, the higher-level network management entity or entities is/are executed from an upstream backhaul access point (e.g., a parent access point (PAP), or a child access point (CAP)). For example, the PAP may be configured to centrally manage all of its CAP(s) and TAP(s) and can instruct any of its managed access points to handover to another backhaul access point. A TAP which is already connected to a first CAP may be instructed, for instance, to change to another CAP by the PAP.

In other embodiments, an access point controller or other mobility management entity may be used to initiate handovers so as to optimize overall network performance, and/or to comply with higher level network management functions.

In still other embodiments, the handovers may be locally managed (e.g., by the CAP and/or TAP of the wireless link). For example, in some cases, the TAP may internally manage connectivity according to user preferences, and/or vehicular information (e.g., navigation path information derived from an indigenous GPS receiver of the client, and/or vehicle telematics system, etc.). Still other schemes for handover selection will be readily appreciated by those of ordinary skill given the contents of the present disclosure.

In other scenarios, handovers may be managed or modified by one or more client devices in conjunction with their access point; in such "distributed" network control schemes, the client device may actively inform the access point of handover possibilities and/or the access point may notify the client device(s) of available networks for backhaul service. The client device(s) may then select an appropriate backhaul access point based on e.g., user preferences, application considerations, cost considerations, etc. Where multiple client devices have conflicting desires, the access point may select one based on e.g., a vote process, time sharing, etc.

In an out-of-band push embodiment, an access point may be "pushed" (or "pulled") into another network's access point registry so as to e.g., resolve network overloading. For example, in one such case, an access point may be receiving poor service from a first network; as a customer service (or perhaps by customer request), the first network may push the access point to a second network for overflow handling. Thereafter, the access point can seamlessly migrate to the second network transparently. Additionally, in some cases, the first network may pre-emptively push access points to an overflow network in anticipation of a network congestion or other event (such as e.g., a train carrying numerous passengers approaching a more highly populated area).

Moreover, access points that meet certain prescribed criteria; e.g., which have frequent coverage loss or regular bandwidth overflows, may benefit from out-of-band push operation. Such decisions are based in one variant on historical data obtained for that AP from one or more sources. To that end, APs may be "ranked" or rated according to their proclivity for such issues, and pushed/pulled in sequence based on that ranking/rating.

Out-of-band push operation may enable seamless cross-network handovers. For example, in one exemplary embodiment, an access point that has backhaul access via a chain of backhaul access points may eventually leave the backhaul access point network; under such conditions, the access point may revert to a cellular/satellite network backhaul. Similarly, where the access point returns to the backhaul access point network coverage, the access point may preferentially handover to a backhaul access point for improved performance. In either of these scenarios, the access point controller and/or access point registry can push/pull the access point registration information to/from the other network, thereby enabling the access point to handover without requiring a termination of existing network connectivity (and subsequent re-establishment), which may cause service interruptions, loss of extant "state" for certain applications or processes running on the client, etc.

The access point can be configured to continuously or periodically search for better backhaul access points, or only search for better backhaul access points when one or more criteria are met; e.g., reception quality is fading or failing. For example, in one such case, the access point only searches for better backhaul access points when the signal quality falls below a reception threshold. In one variant, reception threshold is set at the minimum amount of signal strength needed to sustain data communications (or data communications to a prescribed bandwidth or other performance metric). In another variant, the reception threshold is set at a signal strength where data loss is likely. In still other variants, the reception threshold may be set at a signal strength designated based on network considerations (e.g., as provided by an access point controller, etc.)

Still further, various other parameters of the foregoing may be adjusted (statically or dynamically) so as to optimize network management. For example, increasing the threshold for handover reduces the frequency of handovers, while decreasing the threshold for handover increases the frequency of handovers. Such adjustment may be particularly useful depending on the relative velocities of the access point and/or the backhaul access point in consideration of network resources. Faster moving vehicles may enter/exit coverage quickly; however, each handover transaction can result in undesirable network overhead. Thus, increasing or decreasing the minimum reception threshold may allow an access point to conserve power (rather than continuing to use a fading link, etc.) or alternatively maximize link connectivity even under poor reception circumstances.

It will also be recognized that a given access point may utilize partly or wholly different rules or policies regarding operation, association and/or backhaul access establishment, depending on the identity or affiliation of the various backhaul networks at a given location. For instance, the access point of a MSO subscriber may implement one or more of the foregoing policies whenever its initial and/or "target" access points are each owned and operated by the same MSO (such as may be determined by e.g., MAC address of the AP, SSID, advertisement of the AP as being MSO-associated, etc.), whereas when operating in a non-MSO network, the backhaul access network capability is not utilized.

In some variants, handover procedures include updating registration information within the access point controller and/or network. For example, in some cases, registration with the network may enable the access point to sustain ongoing client device transactions (which may be useful for accounting, billing, etc.). Profile management may be useful so as to, inter alia, reduce messaging overhead and enable session persistence (e.g., reduce re-negotiation of cryptographic keys, etc.), such as where a given access point "hops" (for whatever reason) between backhaul access points within a given coverage area or network.

In some variants of the foregoing, an access point can migrate a data session (including encryption keys, etc.) from a first backhaul network to a second backhaul network. Simple variants may update current session information with new routing paths. More complex embodiments may allow for re-transmission, and/or duplicative transmission of packets, etc. thereby enabling fluid data migration that is transparent to higher layer software applications.

Various other schemes for wireless backhaul link operation will be readily appreciated by those of ordinary skill in the related arts, given the contents of the present disclosure.

Wireless Access Point (AP) Apparatus—

Figure 6:
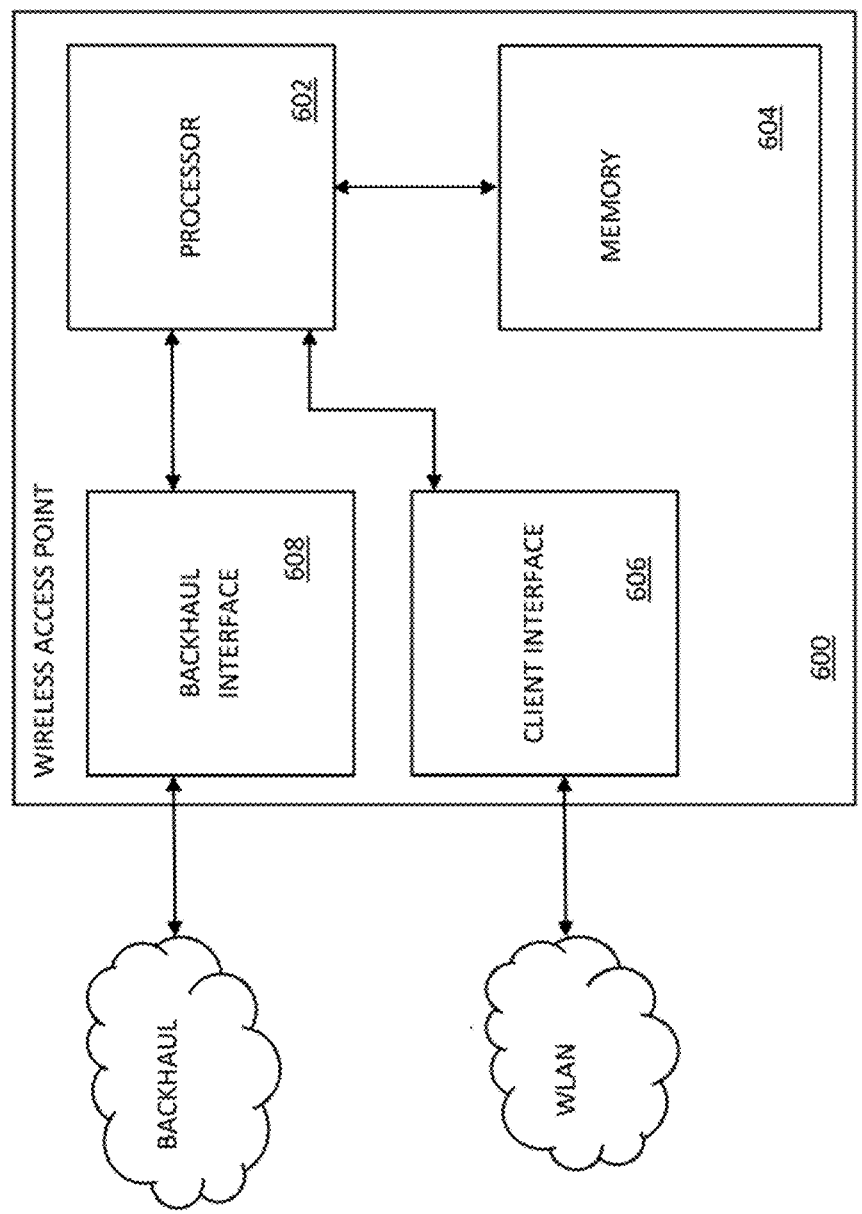
FIG. 6 is a functional block diagram of one embodiment of a wireless access point apparatus according to the present disclosure.

FIG. 6 illustrates one exemplary wireless access point 600 according to the present disclosure. While shown as a generalized device, it will be appreciated that this device and its components may be used as part of the aforementioned TAP, CAP and/or PAP devices, with additions, subtractions and/or modifications to the architecture and functionality as required by the particular application.

As shown, the exemplary access point device includes: a processor subsystem 602, a memory module 604, a client interface 606, and a backhaul interface 608.

In one exemplary embodiment, the processor 602 may include one or more of a digital signal processor, microprocessor, field-programmable gate array, or plurality of processing components mounted on one or more substrates. The processor subsystem 602 may also comprise internal cache memory (e.g., L1/L2/L3 or other types of cache). The processor subsystem is in communication with a memory subsystem 604, the latter including memory which may for example comprise SRAM, flash, and/or SDRAM components, or even "3D" memory arrays. The memory subsystem may implement one or more of DMA-type hardware, so as to facilitate data accesses as is well known in the art.

The processor subsystem 602 is configured to execute at least one computer program stored in memory 604 (e.g., non-transitory computer readable storage media). The computer program may include a plurality of computer readable instructions configured to establish, monitor, and maintain a backhaul access link.

In one embodiment, the client interface 606 (e.g., Wi-Fi interface) is configured to transact one or more data with one or more wireless devices. Each client of the wireless access point has an address that is unique within the wireless network; the address can be used to communicate with the corresponding device. In more complex networks, multiple layers of indirection may be used to assist in address exhaustion (e.g., one address is logically divided into another range of network addresses, etc.). Common examples of Open Systems Interconnection (OSI) based network routing protocols include for example: Internet Protocol (IP), Internetwork Packet Exchange (IPX), and OSI based network technologies (e.g., Asynchronous Transfer Mode (ATM), Synchronous Optical Networking (SONET), Synchronous Digital Hierarchy (SDH), Frame Relay, etc.).

Referring now to the backhaul interface 608 of FIG. 6, one implementation of the wireless access point 600 is configured to: (i) register with an upstream backhaul access point and/or access point controller; (ii) transparently manage backhaul link connectivity to support network connectivity for its wireless clients; and (iii) increase/reduce data rates for its wireless client devices commensurate with the quality of the backhaul link. In one exemplary embodiment, registration of the access point includes registration with an access point registry service provided by a wireless network. In one exemplary embodiment, the registration includes authenticating and authorizing the access point to the service provider's network. On successful authentication and authorization, the access point is enabled/instructed to provision hotspot functionality for its wireless clients. In one variant, the access point provisions network service in accordance with information provided by the service provider's network. For example, the network may specify an SSID for the access point. In another example, the network may instruct the access point to operate a completely independent subnetwork (with a unique SSID), etc.

As will be readily appreciated by those of ordinary skill in the related arts, the access point may provide network service by e.g., providing network identification, managing network congestion, managing capabilities supported by the wireless network, etc. For example, the access point may communicate with wireless clients, and/or intermediary access points to intelligently manage its hotspot data rates and coverage.

In another aspect, the access point 600 is configured to manage and relay packets as an intermediary node from another wireless network to a backhaul network, and vice versa. In one exemplary embodiment, the access point has both relay communications capabilities and gateway functionality (to aggregate data traffic over its own communications). As used in the present context, the term "relay" refers without limitation to any network node that is configured to act as an intermediary between two or more nodes of the network that use e.g., the same protocols, addressing schemes, etc. As used in the present context, the term "gateway" refers without limitation to any network node that is configured to bridge data transactions between networks that use e.g., different protocols, addressing schemes, etc. Common examples of gateway functionality may require, without limitation: protocol translation, network address translation, rate conversion, firewall capabilities, rate buffering, etc.

For example, each intermediary backhaul access point may collect data packets from its downstream devices and arbitrate for access to its upstream device. Once access to the upstream device is granted, the intermediary backhaul access point relays the data packets according to guaranteed quality of service (QoS) requirements, etc. Additionally, while connected to the upstream device, the intermediary backhaul access point can receive packets destined for its downstream devices. Thereafter, the intermediary backhaul access point can relay the downstream packets to its downstream devices.

In one exemplary embodiment, the client interface 606 and backhaul interface 608 of the device 600 of FIG. 6 comprise one or more wireless radio interfaces. In some variants, the client interface and the backhaul interface are physically distinct; in other variants, the interfaces are logically performed over the same physical radio interface (e.g., time and/or frequency multiplexed). Generally, a radio interface incorporates an assembly of filters, low noise amplifiers (LNAs), power amplifiers (PAs), and antenna assemblies that are configured to transmit a modulated waveform via an air interface. As shown, the radio/modem subsystem may be configured to support MIMO (Multiple Input Multiple Output) antenna technology in which multiple antennas are used to transmit and receive signaling. With MIMO, multiple independent data streams can be transmitted in parallel using the same time-frequency resource. To distinguish the data streams sharing this same time-frequency resource, spatial division multiplexing is applied. Those of ordinary skill in the related arts will readily appreciate that SISO (Single In, Single Out), SIMO (Single In, Multiple Out), and MISO (Multiple In, Single Out) antenna schemes may be substituted with equivalent success.

While the present disclosure is primarily directed to Wi-Fi implementations compliant with IEEE 802.11, artisans of ordinary skill in the related arts, given the contents of the present disclosure, will readily appreciate that the various principles described herein are readily applicable to any wireless interface, including but not limited to: Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

In one embodiment the backhaul interface 608 of the device 600 of FIG. 6 comprises a wired interface (e.g., GbE, 10G, or similar) that connects to a router, gateway, or other service node of a backhaul network. While the present disclosure is primarily directed to Ethernet implementations compliant with IEEE 802.3, artisans of ordinary skill in the related arts, given the contents of the present disclosure, will readily appreciate that the various principles described herein are readily applicable to any wired interface, including but not limited to: FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), etc.

Access Point Controller Apparatus—

FIG. 7 illustrates one exemplary Access Point (AP) controller 700 according to the present disclosure. As shown, the AP controller includes: a processor 702, a memory module 704, and a network interface 706. Artisans of ordinary skill in the related arts will readily appreciate, given the present disclosure, that the AP Controller may be virtualized and/or distributed within other core network entities, the foregoing apparatus being purely illustrative.

In one exemplary embodiment, the processor 702 may include one or more of a digital signal processor, microprocessor, field-programmable gate array, or plurality of processing components mounted on one or more substrates. The processor 702 may also comprise an internal cache memory. The processing subsystem is in communication with a memory subsystem 704, the latter including memory which may for example comprise SRAM, flash, and/or SDRAM components. The memory subsystem may implement one or more of DMA type hardware, so as to facilitate data accesses as is well known in the art.

The device 700 also optionally includes one or more back-end interfaces 708 for, e.g., connection to other network entities, devices, local monitoring or I/O devices, storage, etc.

The processing apparatus 702 is configured to execute at least one computer program stored in memory 704 (e.g., non-transitory computer readable storage media). The computer program may include a plurality of computer readable instructions configured to track and store information corresponding to one or more access points of the network. Other embodiments may implement such functionality within dedicated hardware, logic, and/or specialized co-processors (not shown). For instance, the AP controller can be located in one or more MSO data centers, and/or in other "cloud" entities (whether within our outside of the MSO network).

In one embodiment, the AP controller 700 is configured to register wireless clients and access points, and centrally control the broader wireless network (and constituent sub-networks). Common examples of configuration include: providing network identification, managing network congestion, managing capabilities supported by the wireless network, etc. For example, the AP controller may communicate with access points and/or enable/disable intermediary backhaul relay connectivity to intelligently manage the overall coverage provided by the wireless network and sub-network coverage. In some variants, the AP controller 700 may be configured to push (or respond to pull requests) for access points and/or wireless clients so as to augment and/or enhance its coverage area.

In one embodiment, the AP controller is further configured to communicate with one or more authentication, authorization, and accounting (AAA) servers of the core network. The AAA servers are configured to provide, inter alia, authorization services and facilitate tracking and/or control of network subscribers for intelligently controlling access to computer resources, enforcing policies, auditing usage, and providing the information necessary to bill for services.

In some variants, authentication processes are configured to identify a subscriber, typically by having the subscriber enter a valid user name and valid password before access is granted. The process of authentication may be based on each subscriber having a unique set of criteria or credentials (e.g., unique user name and password, challenge questions, entry of biometric data, entry of "human" verification data such as "Captcha" data, etc.) for gaining access to the network. For example, the AAA servers may compare a user's authentication credentials with user credentials stored in a database. If the authentication credentials match the stored credentials, the user may then be granted access to the network. If the credentials are at variance, authentication fails and network access may be denied.

In some embodiments, a user may be granted network access upon payment of a service charge. After receiving the user's payment information, the AAA servers may grant network access to the user for a particular session and/or for predetermined period of time. If the user is granted access for a predetermined time period, the AAA server may store credentials for the user in the database for authenticating the user when the user requests access to the network during that time period.

It will also be appreciated that users may provide payment of e.g., a service charge while the vehicle is moving through a structure or past a prescribed infrastructure point. For example, in one implementation, an RFID (radio-frequency identification) or other similar wireless system of the type generally known in the art can be used to debit a user's account when the user is, e.g., entering onto a toll road, bridge, or other "metered" transportation structure within their vehicle. The vehicle for example may be interrogated using a (comparatively) short-range RFID signal, and a corresponding RFID device (e.g., clipped to the vehicle's visor, adhered to the windshield, etc.) responds with user identification and/or account data to enable the transaction to be processed. The RFID interrogator may be in data communication with one or more MSO (or third party) network components, which may pass the received data to an MSO network entity for processing and identification as an MSO subscriber or other "entitled" user. In this fashion the Wi-Fi network previously described herein can be selectively turned on/off for that individual user (such as be instructing the system controller to process communications to/from a MAC address and/or SSID of a user's device that has been registered with the MSO or network operator. In one such variant, the user's smartphone or tablet is registered with the MSO, and subsequently upon user payment via RFID, any devices associated with (registered in association with) the user's MSO account are "enabled" within the toll road, etc. for Wi-Fi communication. Other non-authorized communications from e.g., vehicles associated with users who are not MSO subscribers will simply be ignored or filtered.

Following authentication, the AAA servers are configured to grant a subscriber authorization for certain features, functions, and/or doing certain tasks. After logging into a system, for instance, the subscriber may try to enable a vehicular access point. The authorization process determines whether the user has the authority to issue such requests. Simply put, authorization is the process of enforcing policies: determining what types or qualities of activities, resources, or services a user is permitted. Usually, authorization occurs within the context of authentication. Once a user is authenticated, they may be authorized for different types of access or activity. A given user may also have different types, sets, or levels of authorization, depending on any number of aspects. For instance, a given subscriber may be authorized to: enable a vehicular access point, access a vehicular access point, prevent other subscribers from requesting vehicular access, etc.

The AAA servers may be further configured for accounting, which measures the resources a user consumes during access. This may include the amount of system time or the amount of data a user has sent and/or received during a session, somewhat akin to cellular data plans based on so many consumed or available Gb of data. Accounting may be carried out by logging of session statistics and usage information, and is used for, inter alia, authorization control, billing, trend analysis, resource utilization, and capacity planning activities. It will be appreciated that in other examples, one or more AAA servers can be located at the regional data center, and may be linked to a third-party or proxy server, such as that of an event management entity.

Accounting information may be used to compensate subscribers for their access point services, and/or resource consumption. As previously noted, compensation may be monetary e.g., in the form of billing rebates, promotions, reduced service fees, etc. In other situations, the compensation may be service related i.e., preferential service, and/or unlocking desirable device features, etc.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized device configured to operate within a wireless network, the computerized device comprising:

processor apparatus;

a backhaul data interface in data communication with the processor apparatus and configured to transact digital data with a plurality of access points, each of the plurality of access points being in data communication with a network entity of the wireless network;

a client data interface in data communication with the processor apparatus and configured to transact the digital data with one or more client devices; and a non-transitory computer-readable storage medium in data communication with the processor apparatus and having at least one computer program stored thereon, the at least one computer program comprising a plurality of instructions configured to, when executed by the processor apparatus, cause the computerized device to:

establish a first wireless data connection with a first one of the plurality of access points via the backhaul data interface when the computerized device is disposed in a first location;

establish a second wireless data connection with a client device; and responsive to a first signal quality parameter associated with the first one of the plurality of access points falling below a threshold, establish a third wireless data connection with a second one of the plurality of access points while maintaining the second wireless data connection with the client device, and terminate the first wireless data connection with the first one of the plurality of access points, the second one of the plurality of access points also being in data communication with the network entity of the wireless network.

2. The computerized device of claim 1, wherein:
the computerized device comprises a vehicular access point configured to provide data network connectivity to a plurality of client devices based on one or more network parameters via at least the second wireless data connection, the vehicular access point being further configured to provide the data network connectivity using a centrally managed allocation scheme for the plurality of client devices; and
the plurality of instructions are further configured to, when executed by the processor apparatus, cause the vehicular access point to grant a respective amount of bandwidth based on a prioritization of bandwidth according to the centrally managed allocation scheme;
wherein the centrally managed allocation scheme is configured to reduce interference among the plurality of client devices.

3. The computerized device of claim 1, wherein the establishment of the third wireless data connection and the termination of the first wireless data connection are configured to occur in response to the computerized device moving from the first location to a second location; and
wherein the second location corresponds to a different signal quality parameter than the first signal quality parameter associated with the first one of the plurality of access points.

4. The computerized device of claim 1, wherein the establishment of the second wireless data connection with the client device comprises a determination of at least one of (i) whether a subscriber of the client device is authorized to access the computerized device and (ii) whether the subscriber of the client device is authorized to prevent at least one other subscriber from requesting access to the computerized device.

5. The computerized device of claim 1, wherein the plurality of instructions are further configured to, when executed by the processor apparatus, cause the computerized device to perform a handover between (i) the second one of the plurality of access points of the wireless network and (ii) a third access point of a different wireless network, the third access point being in data communication with a different network entity than the network entity of the wireless network.

6. The computerized device of claim 1, wherein a data transmission rate corresponding to the transaction of the digital data with the one or more client devices is commensurate with a quality of the backhaul data interface.

7. The computerized device of claim 1, wherein:
the computerized device is associated with a network address that is unique within the wireless network;
the second wireless data connection comprises a wireless local area network (WLAN) connection with the client device established using the network address, the WLAN connection enabling the client device to transact the digital data with the network entity of the wireless network.

8. The computerized method of claim 1, wherein:
the computerized device comprises a mobile access point configured to provide wireless connectivity to the client device via the second wireless data connection and at least one of the plurality of access points; and
the first signal quality parameter associated with the first one of the plurality of access points falling below the threshold is caused at least in part by the mobile access point moving to a second location that is different from the first location.

9. A non-transitory computer-readable medium comprising a storage apparatus having at least one computer program stored thereon, the at least one computer program comprising a plurality of instructions configured to, when executed by a processor apparatus, cause a network apparatus to:
establish a first backhaul data connection with a first access point in data communication with a network entity of a first network;
establish a wireless data connection with a client device;
responsive to the network apparatus moving from a first location to a second location, establish a second backhaul data connection with a second access point in data communication with the network entity of the first network via the first access point, and concurrently maintain the wireless data connection with the client device; and
responsive to the network apparatus moving from the second location to a third location, establish a third backhaul data connection with a third access point in data communication with a network entity of a second network;
wherein the network apparatus is associated with a persistent identifier configured to allow the network apparatus to maintain the wireless data connection with the client device when the network apparatus moves from the second location to the third location, the wireless data connection being configured to enable data communication between the client device and one or more of the first network or the second network.

10. The non-transitory computer-readable medium of claim 9, wherein the persistent identifier comprises unique identifier data corresponding to the network apparatus, the unique identifier data being stored in a registration database on the first network and the second network, the registration database comprising respective unique identifier data corresponding to a plurality of recognized network apparatus.

11. The non-transitory computer-readable medium of claim 9, wherein the network apparatus is configured to maintain a data connection to both the first network and the second network simultaneously.

12. The non-transitory computer-readable medium of claim 9, wherein the establishment of the second backhaul data connection with the second access point is configured to occur responsive to a signal quality associated with the first backhaul data connection established with a first access point achieving a value lower than a reception threshold.

13. The non-transitory computer-readable medium of claim 12, wherein the reception threshold corresponds to (i) a minimum signal strength required to sustain the first backhaul data connection or (ii) a signal strength determined based on a likelihood of data loss; and
wherein the reception threshold is adjustable based on one or more of (i) a velocity of the network apparatus and (ii) the signal strength.

14. The non-transitory computer-readable medium of claim 9, wherein the network apparatus comprises a Wi-Fi-enabled transit access point configured to deliver digital data to the client device, the client device comprising a Wi-Fi-enabled user device;
wherein the Wi-Fi-enabled transit access point is configured to be installed on a vehicle capable of moving the transit access point among the first, second, and third locations so as to enable the first, second, and third backhaul data connections; and wherein the plurality of instructions are further configured to, when executed by a processor apparatus, cause the network apparatus to modify a data throughput of the Wi-Fi-enabled transit access point to the client device based on a respective distance to the first, second, and third access points.

15. A computerized method of operating a wireless network using a mobile access point, the computerized method comprising:

establishing a first wireless data connection to a backhaul access point;

providing wireless connectivity coverage for one or more computerized client devices, the wireless connectivity coverage being provided via one or more second wireless data connections;

providing digital data to the one or more computerized client devices from the backhaul access point via respective ones of the one or more second wireless data connections;

monitoring a link quality associated with the first wireless data connection to the backhaul access point;

causing the backhaul access point to initiate a third wireless data connection of the one or more computerized client devices with another backhaul access point, the other backhaul access point being in data communication with the backhaul access point, the causing based at least on determining that the third wireless data connection with the other backhaul access point is available and is associated with a link quality greater than the link quality associated with the first wireless data connection;

after the initiation of the third wireless data connection, providing the digital data to the one or more computerized client devices from the other backhaul access point via the third wireless data connection and via the respective ones of the one or more second wireless connections;

monitoring the link quality associated with the third wireless data connection; and evaluate a link quality associated with at least one other backhaul access point based on the monitored link quality associated with the third wireless data connection falling below a threshold link quality, the threshold link quality corresponding to at least one of (i) a minimum signal strength required to sustain the third wireless data connection or (ii) a signal strength determined based on a likelihood of data loss.

16. The computerized method of claim 15, wherein the monitoring of the link quality associated with the first wireless data connection comprises measuring the link quality associated with the first wireless data connection at intervals prescribed dynamically based on at least one of one or more physical conditions, the one or more physical conditions comprising one or more of velocity, acceleration, or deceleration of a vehicle in which the mobile access point is installed; and wherein the method further comprises adjusting, based on the monitored link quality associated with the first wireless data connection, the providing of the digital data to the one or more computerized client devices from the backhaul access point.

17. The computerized method of claim 15, wherein the causing of the backhaul access point to initiate the third wireless data connection comprises causing a handover based on (i) a movement from a first location to a second location of a computerized mobile access point providing the wireless connectivity coverage, the second location being associated with the other backhaul access point, and (ii) the link quality associated with the third wireless connection exceeding the link quality associated with the first wireless connection according to one or more prescribed metrics.

18. The computerized method of claim 17, further comprising:

broadcasting one or more beacons;

enabling at least one of the one or more computerized client devices to discover the computerized mobile access point based on the broadcasted one or more beacons; and enabling the at least one or more computerized client devices to determine signal strength with respect to the computerized mobile access point and to determine whether to connect with the computerized mobile access point based at least on the determined signal strength.

19. The computerized method of claim 15, further comprising receiving data representative of one or more network parameters, the one or more network parameters comprising one or more of (i) a service set identifier (SSID), (ii) a data rate associated with the first wireless connection with the backhaul access point, and (iii) an interval for broadcasting beacons to the one or more computerized client devices.

20. The computerized method of claim 15, further comprising arbitrating for resources associated with the wireless connectivity coverage, the arbitrating comprising implementing one or more operations to (i) avoid collision among at least the backhaul access point and the one or more computerized client devices, (ii) assign the time slots for the providing of the digital data, or (iii) assign uplink and downlink frequencies.

21. A computerized vehicular access point configured to provide data network connectivity to a plurality of client devices based on one or more network parameters and using a centrally managed allocation scheme configured to reduce interference among the plurality of client devices, the computerized vehicular access point comprising:

processor apparatus;

a backhaul data interface in data communication with the processor apparatus and configured to transact digital data with a plurality of access points, each of the plurality of access points being in data communication with a network entity of the wireless network;

a client data interface in data communication with the processor apparatus and configured to transact the digital data with one or more client devices; and a non-transitory computer-readable storage medium in data communication with the processor apparatus and having at least one computer program stored thereon, the at least one computer program comprising a plurality of instructions configured to, when executed by the processor apparatus, cause the computerized device to:

establish a first wireless data connection with a first one of the plurality of access points via the backhaul data interface when the computerized device is disposed in a first location;

establish a second wireless data connection with a client device; and responsive to a first signal quality parameter associated with the first one of the plurality of access points falling below a threshold, establish a third wireless data connection with a second one of the plurality of access points while maintaining the second wireless data connection with the client device, and terminate the first wireless data connection with the first one of the plurality of access points, the second one of the plurality of access points also being in data communication with the network entity of the wireless network;

and wherein the plurality of instructions are further configured to, when executed by the processor apparatus, cause the vehicular access point to grant a respective amount of bandwidth based on a prioritization of bandwidth according to the centrally managed allocation scheme.

* * * * *